United States Patent
Shigehara et al.

[11] Patent Number: 5,841,619
[45] Date of Patent: Nov. 24, 1998

[54] INTERFACE CIRCUIT FOR USE IN A SEMICONDUCTOR INTEGRATED CIRCUIT

[75] Inventors: Hiroshi Shigehara, Oita; Yasunori Tanaka, Yokosuka; Junya Masumi, Sagamihara, all of Japan

[73] Assignee: Kabushiki Kaisha Toshiba, Kawasaki, Japan

[21] Appl. No.: 567,709

[22] Filed: Dec. 5, 1995

[30] Foreign Application Priority Data

Dec. 6, 1994 [JP] Japan .................................. 6-302222

[51] Int. Cl.$^6$ ....................................................... H02H 3/00
[52] U.S. Cl. .............................. 361/111; 361/56; 361/118; 361/119
[58] Field of Search ............................... 361/111, 56, 91, 361/118, 119

[56] References Cited

U.S. PATENT DOCUMENTS

| 5,229,635 | 7/1993 | Bessolo et al. | 257/360 |
| 5,361,185 | 11/1994 | Yu | 361/111 |
| 5,430,595 | 7/1995 | Wagner et al. | 361/56 |
| 5,450,267 | 9/1995 | Diaz et al. | 361/56 |
| 5,455,436 | 10/1995 | Cheng | 247/356 |

FOREIGN PATENT DOCUMENTS

| 0 621 692 A2 | 10/1994 | European Pat. Off. | ..... H03K 19/003 |
| 0 675 453 A2 | 10/1995 | European Pat. Off. | ........ H01L 27/02 |

OTHER PUBLICATIONS

Wong, D. T. et al., IEEE J. Solid–State Circuits, "An 11–ns 8K X 18 CMOS Static RAM with 0.5–um Device ", vol. 23, No. 5, pp. 1095–1103, dated Oct. 5, 1988.

Ueda, M. et al; IEEE 1993 CICC, 25.5.1, "3.3V ASIC for Mixed Voltage Applications with Shut Down Mode".

*Primary Examiner*—Jeffrey A Gaffin
*Assistant Examiner*—Stephen Jackson
*Attorney, Agent, or Firm*—Banner & Witcoff, Ltd.

[57] ABSTRACT

To an input terminal is connected one end of the source-to-drain current path of an NMOS the gate of which is connected to Vcc. The other end of the current path of the NMOS is connected by a protection circuit comprised of a PMOS and an NMOS to the common gates of a PMOS and an NMOS in the input stage of an internal circuit. In the protection circuit, the PMOS has its source and gate connected to Vcc and its drain connected to the common gates of the PMOS and the NMOS, while the NMOS has its source and gate connected to Vss and its drain connected to the common drains of the PMOS and the NMOS.

21 Claims, 20 Drawing Sheets

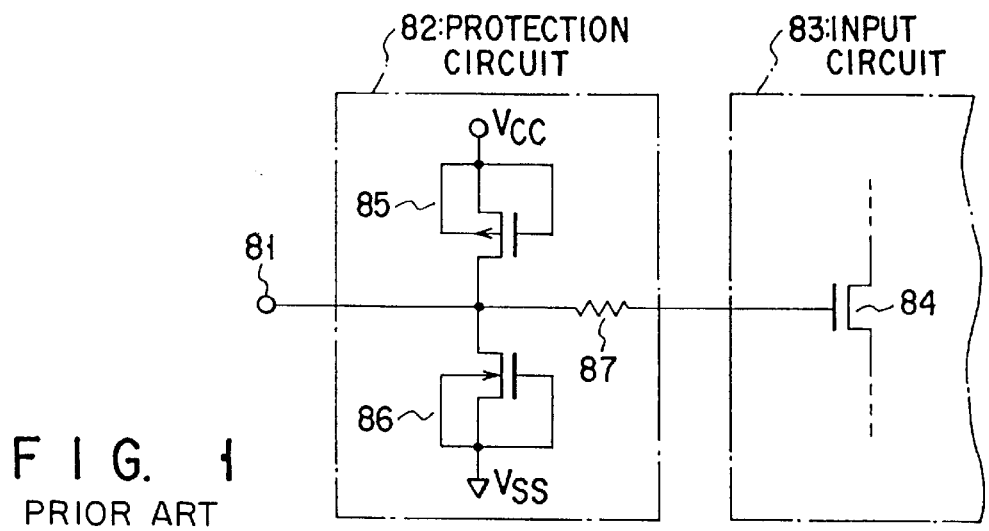
FIG. 1
PRIOR ART
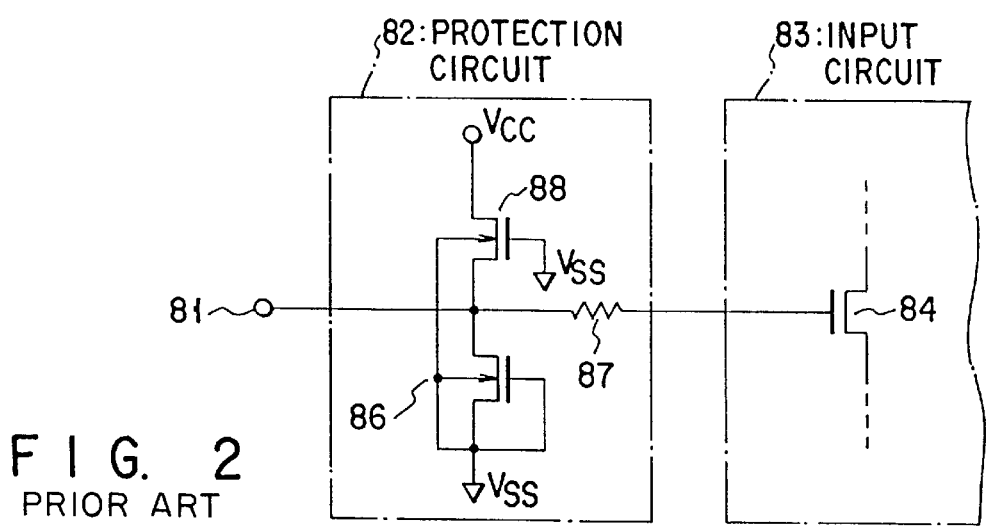
FIG. 2
PRIOR ART
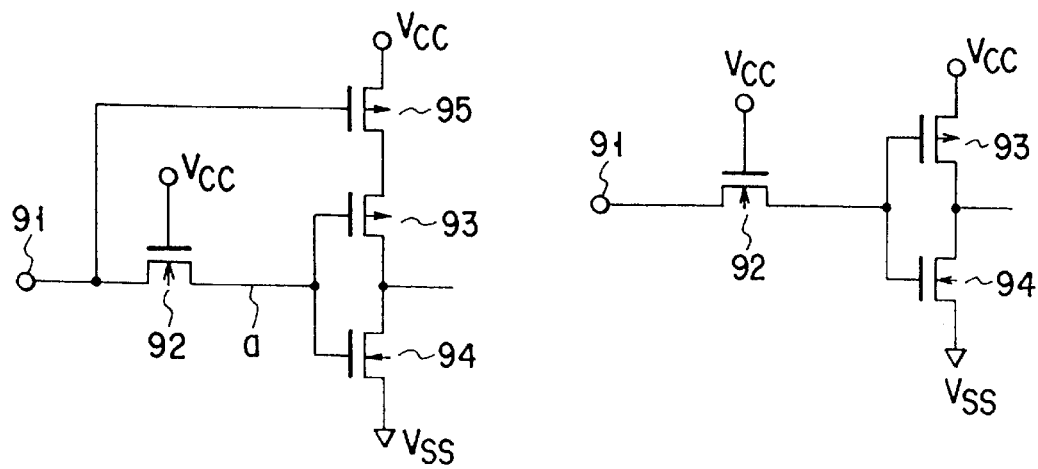
FIG. 3
PRIOR ART
FIG. 4
PRIOR ART

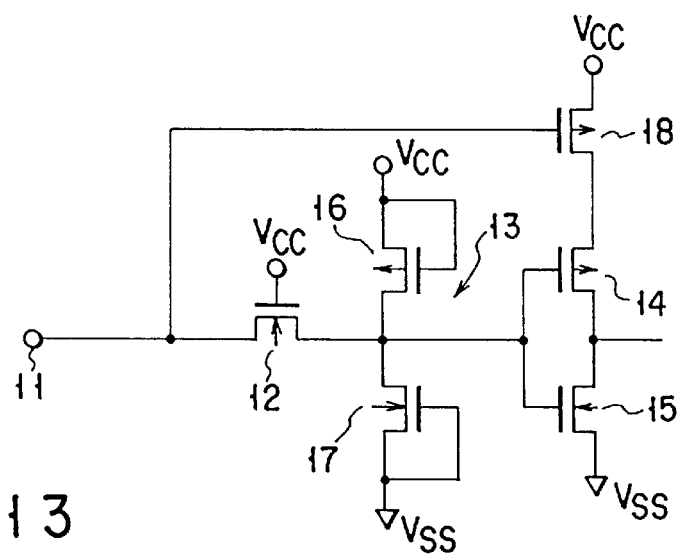
F I G. 13
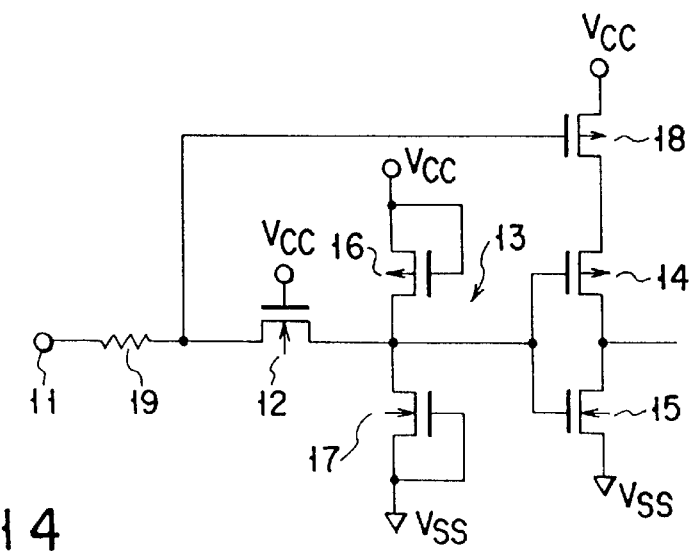
F I G. 14

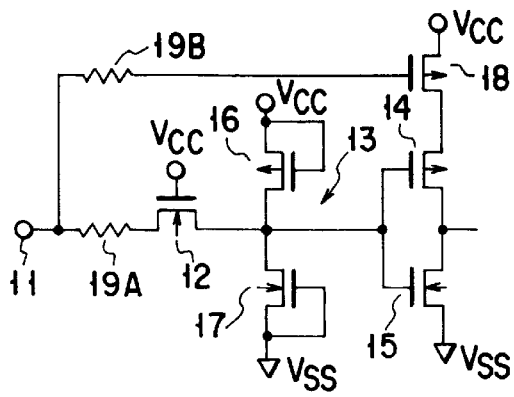
F I G. 15
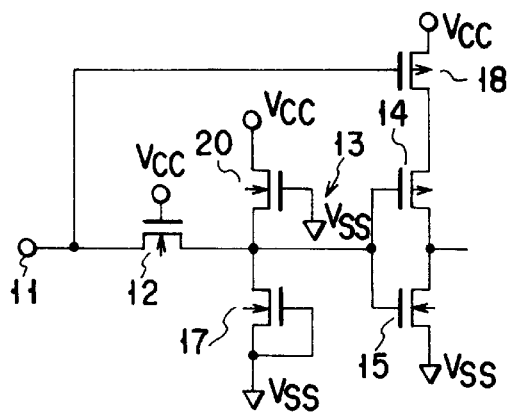
F I G. 16
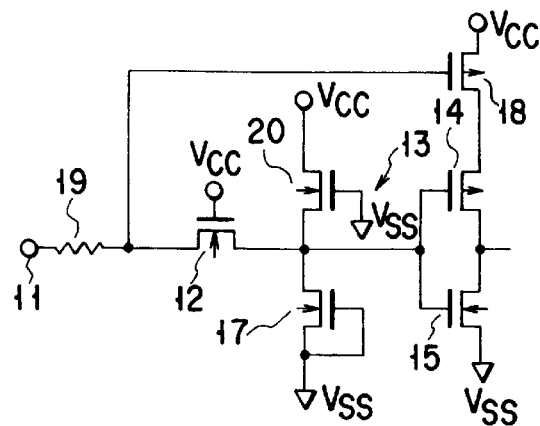
F I G. 17
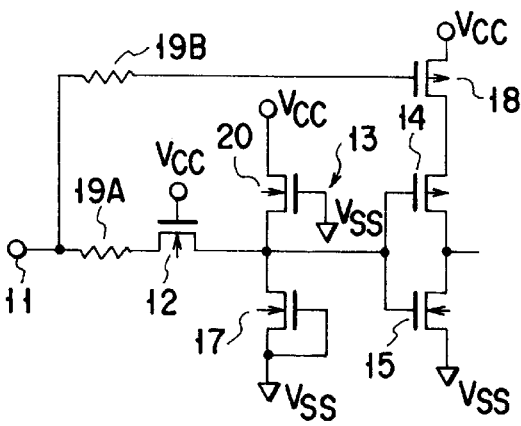
F I G. 18
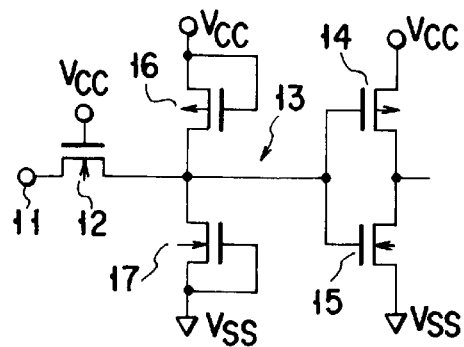
F I G. 19
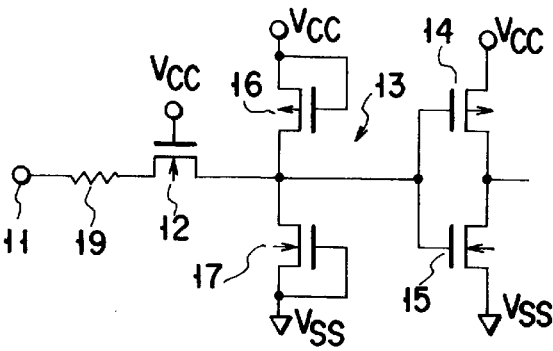
F I G. 20

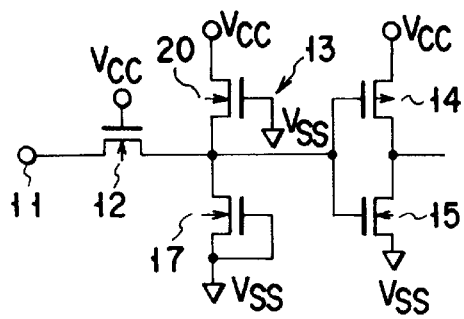
F I G. 21
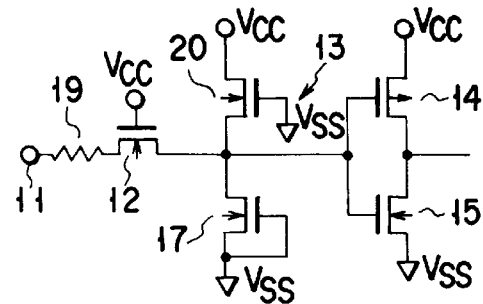
F I G. 22
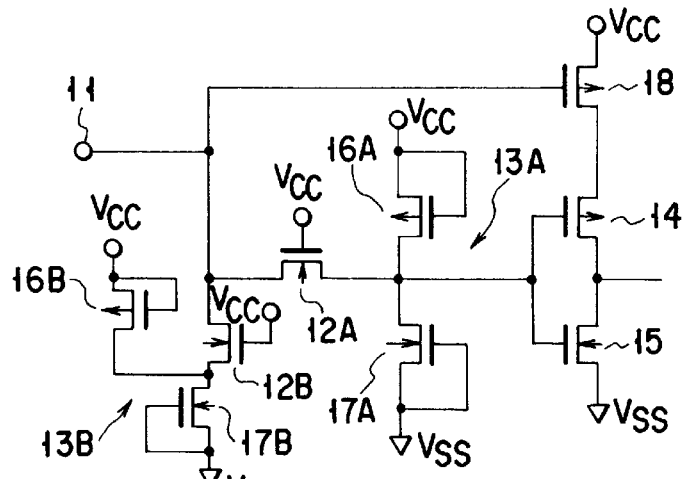
F I G. 23
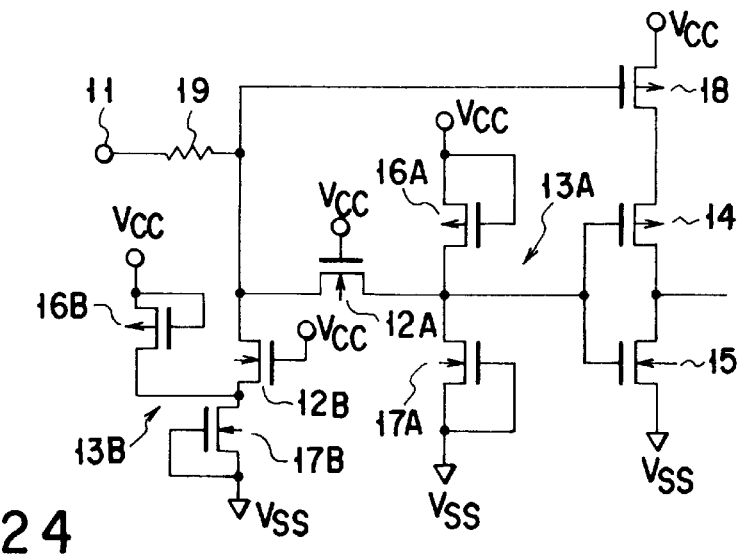
F I G. 24

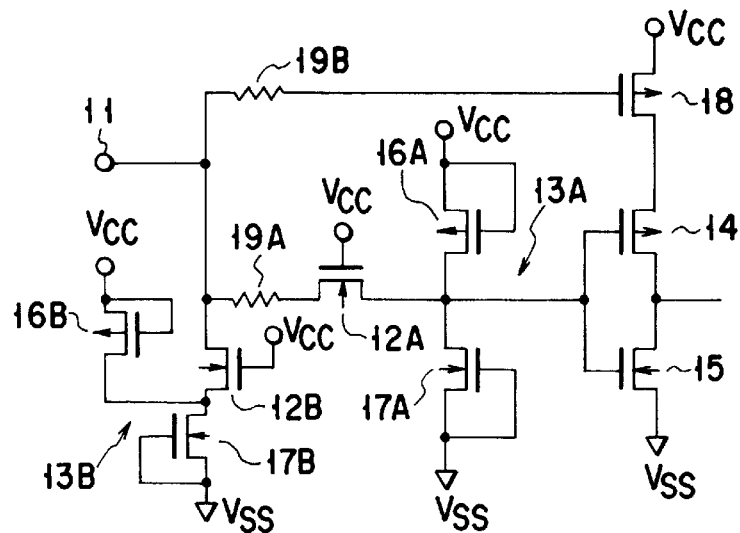
F I G. 25
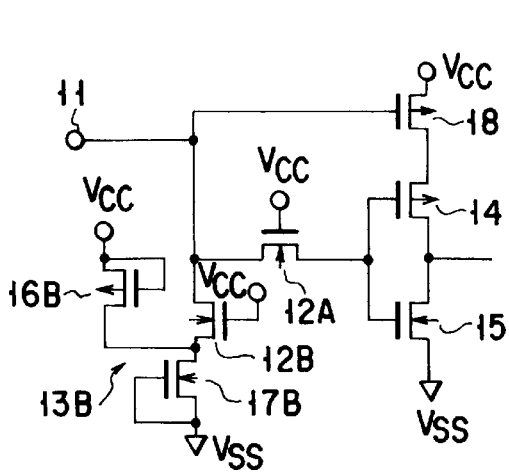
F I G. 26
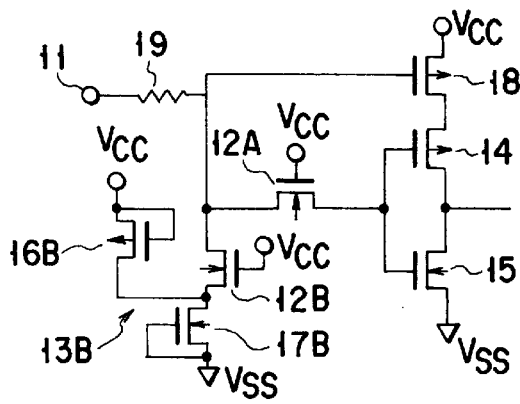
F I G. 27
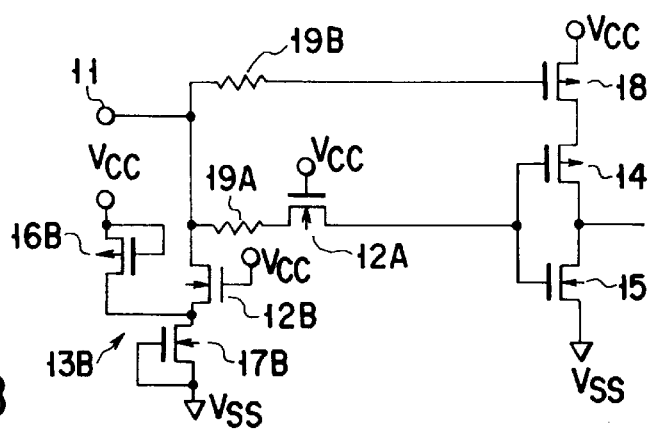
F I G. 28

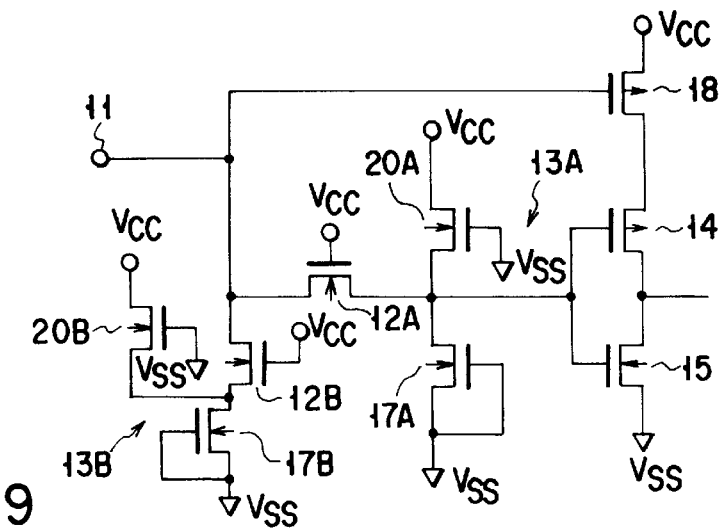
F I G. 29
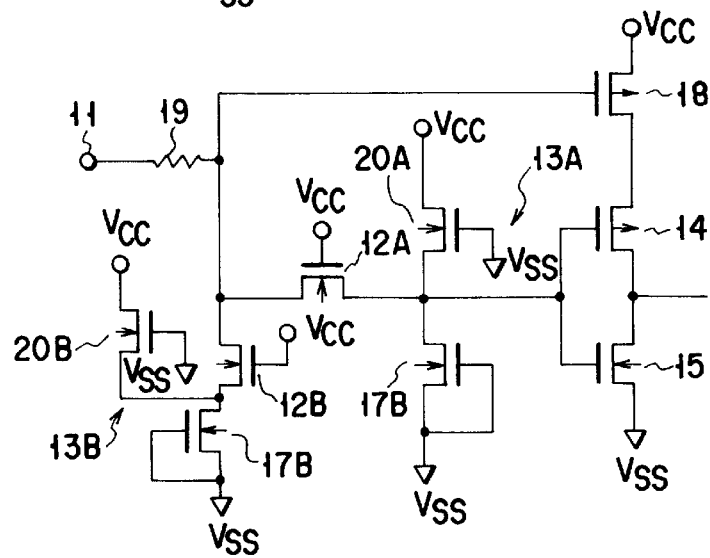
F I G. 30
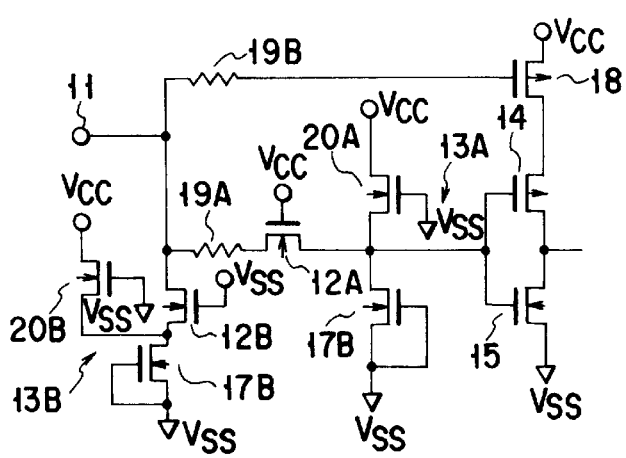
F I G. 31
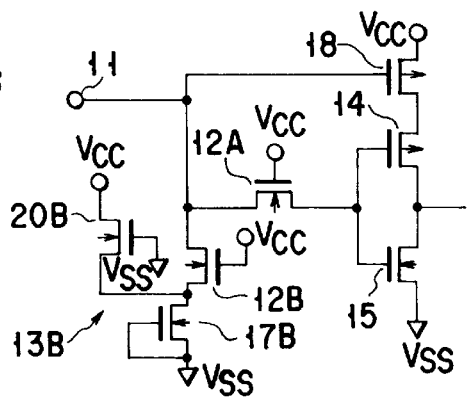
F I G. 32

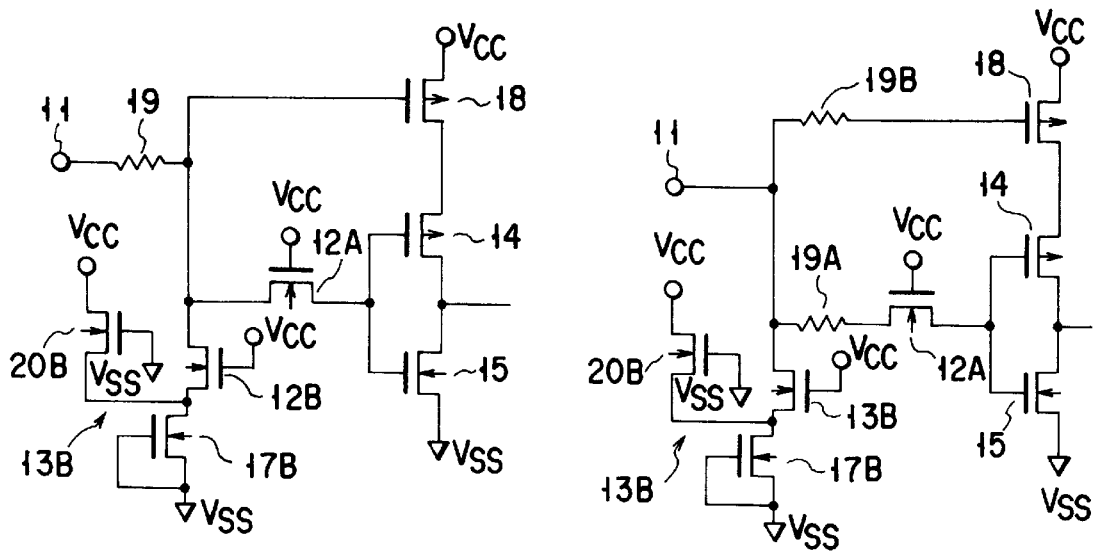
F I G. 33  F I G. 34
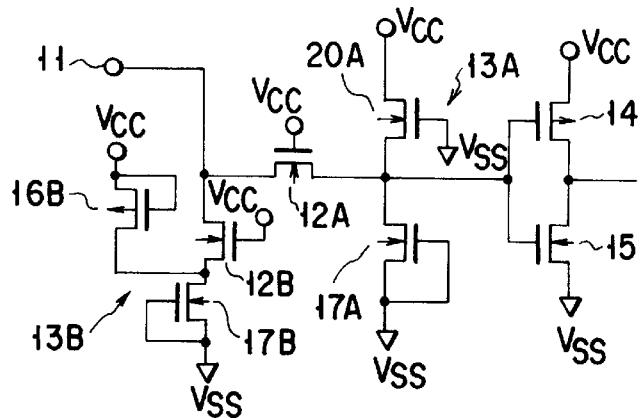
F I G. 35
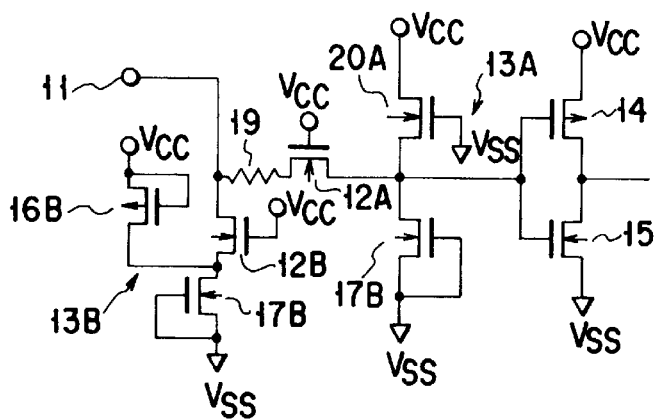
F I G. 36

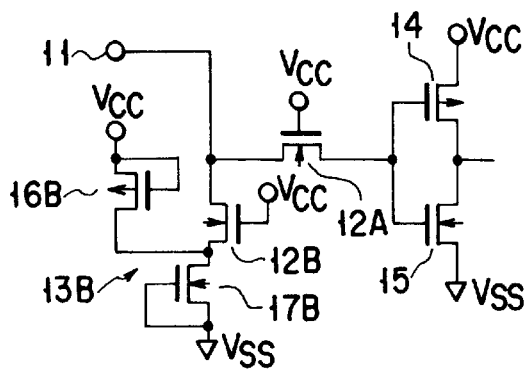
F I G. 37
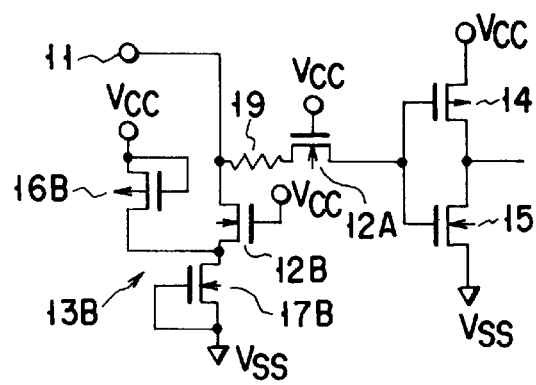
F I G. 38
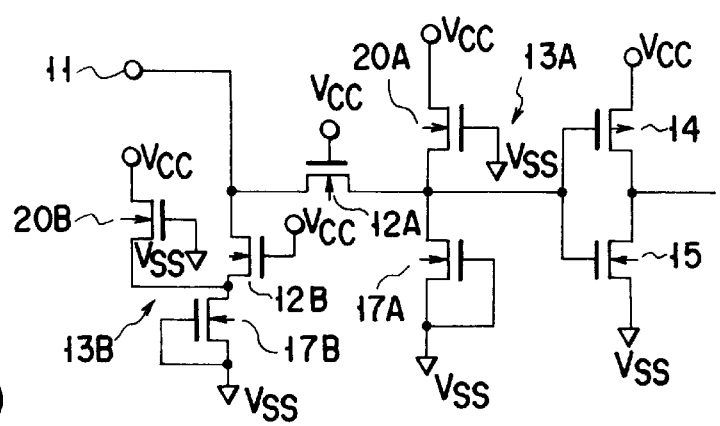
F I G. 39
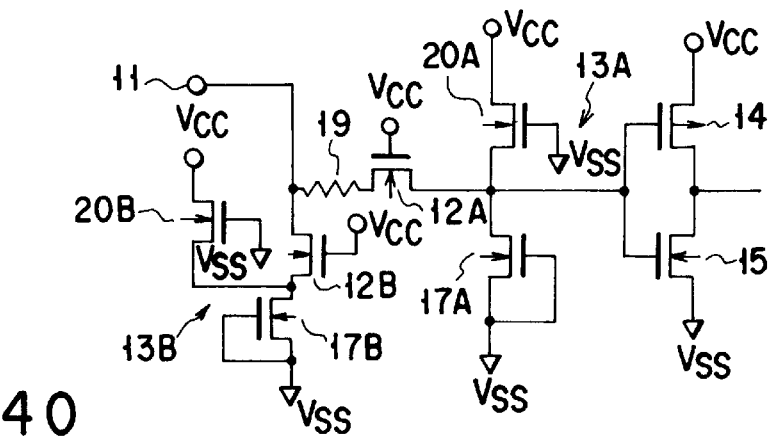
F I G. 40

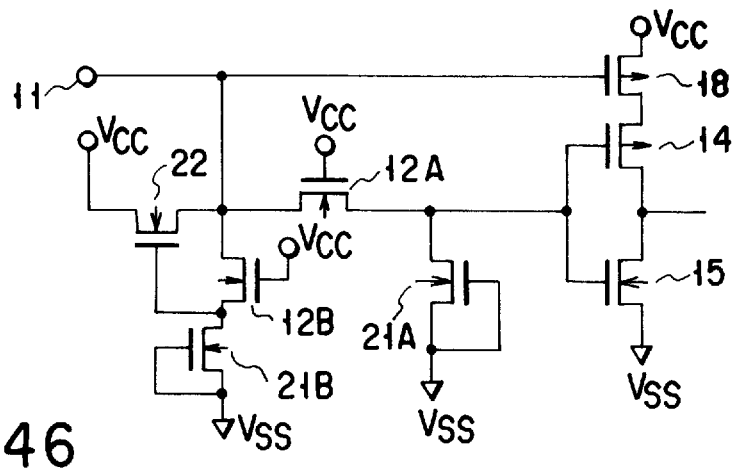
F I G. 46
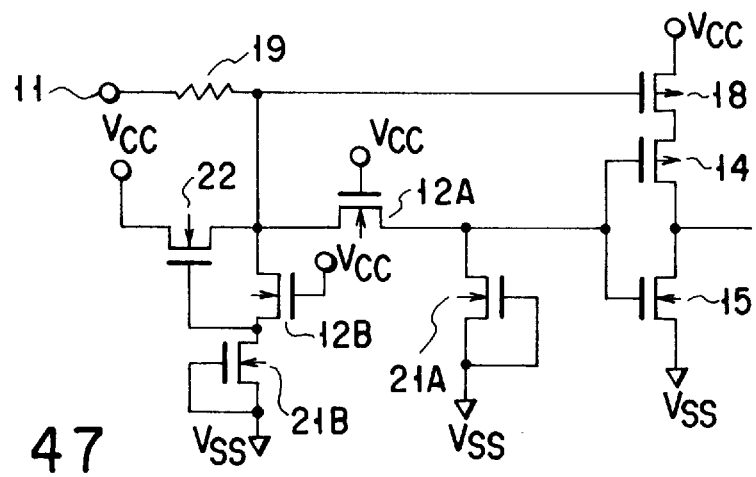
F I G. 47
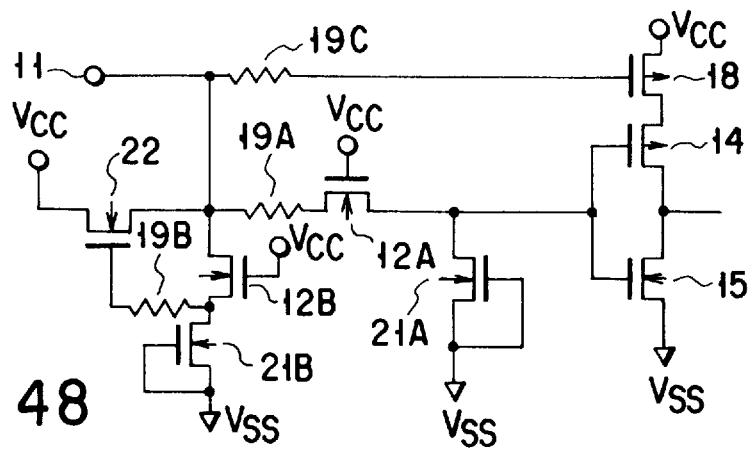
F I G. 48

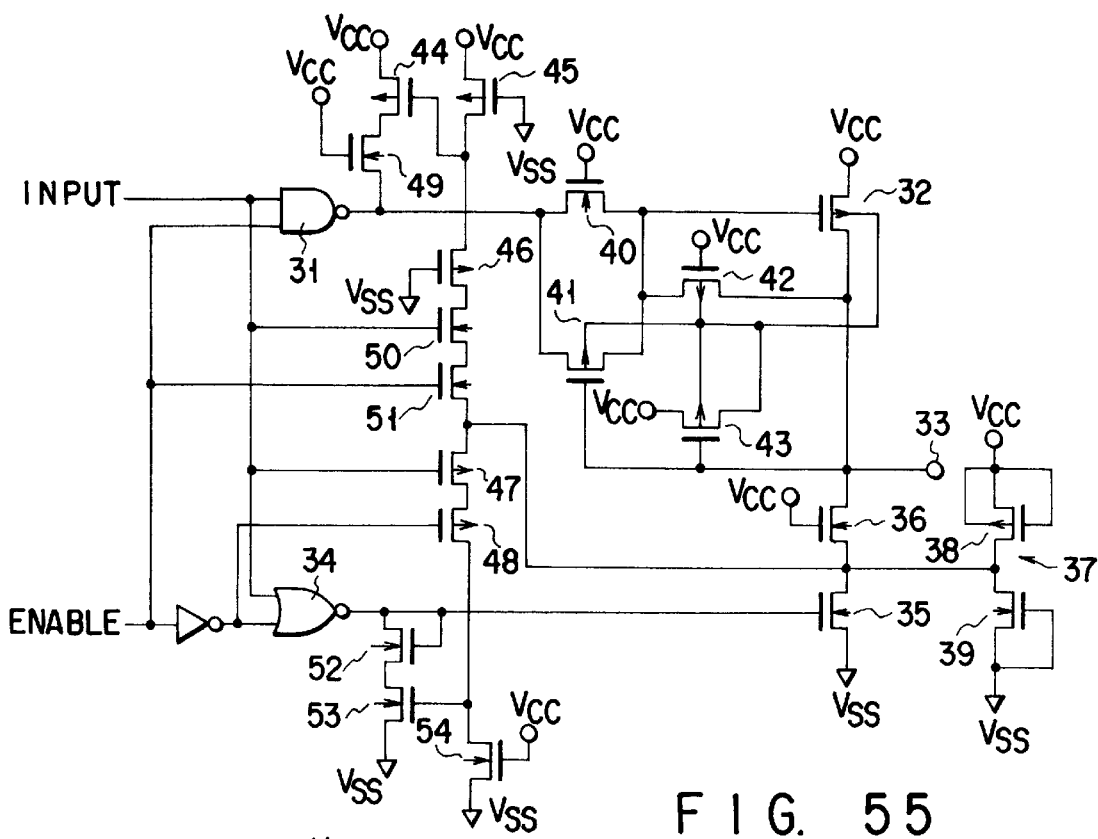
F I G. 55
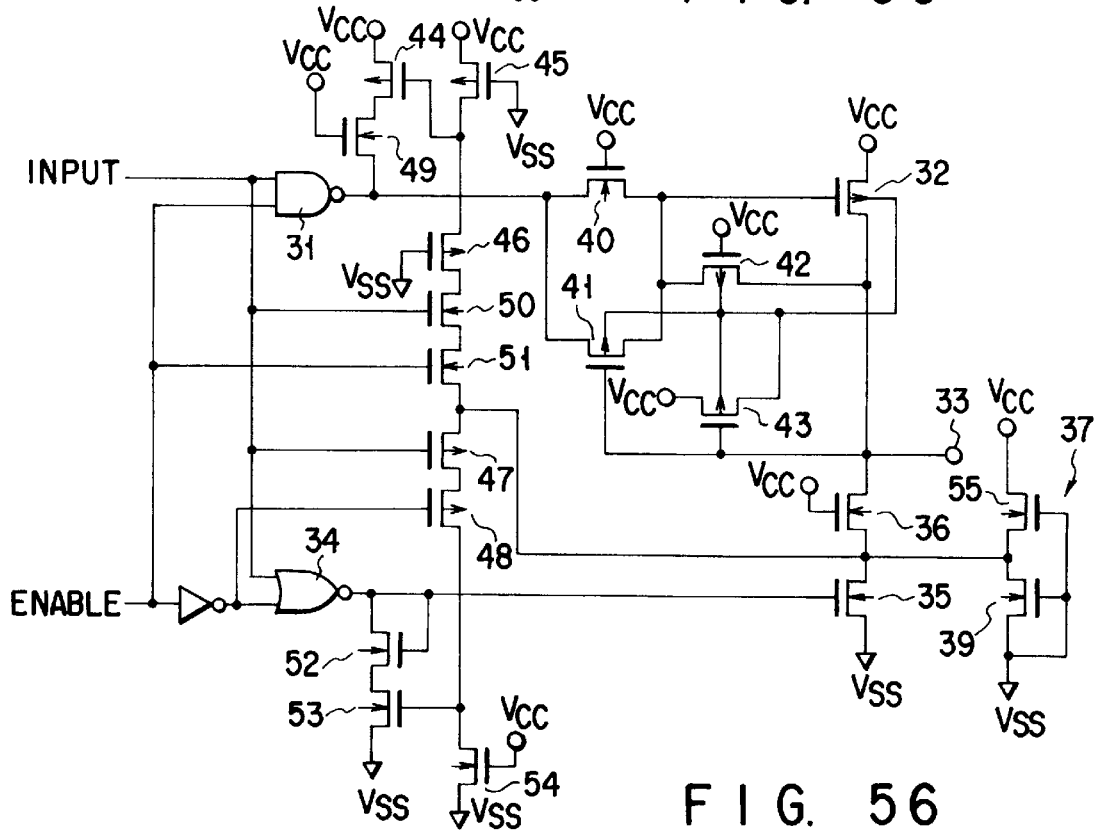
F I G. 56

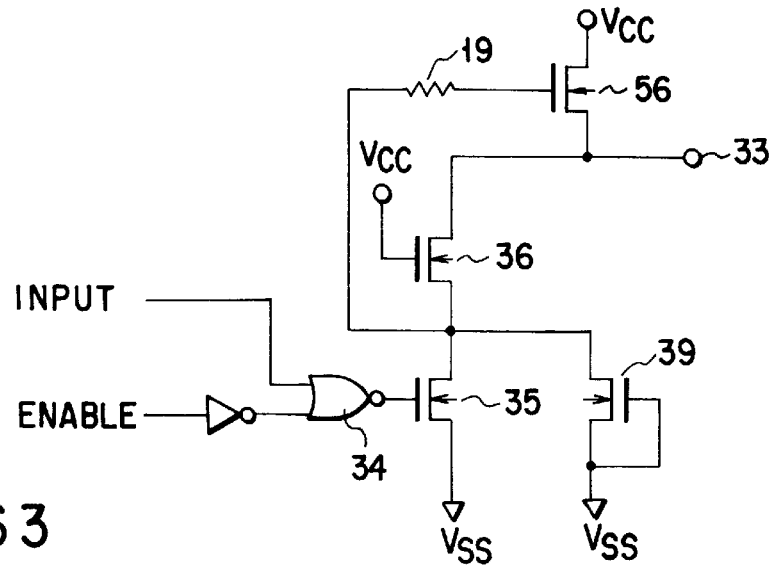
F I G. 63
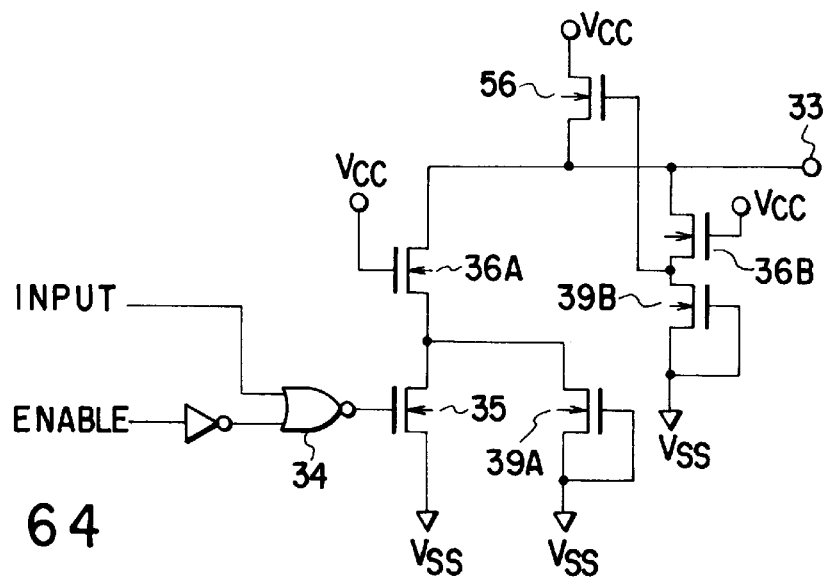
F I G. 64
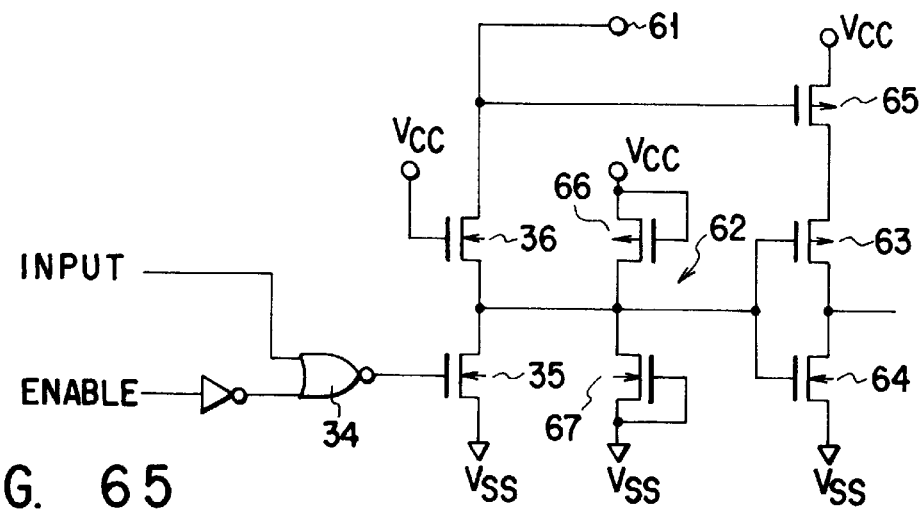
F I G. 65

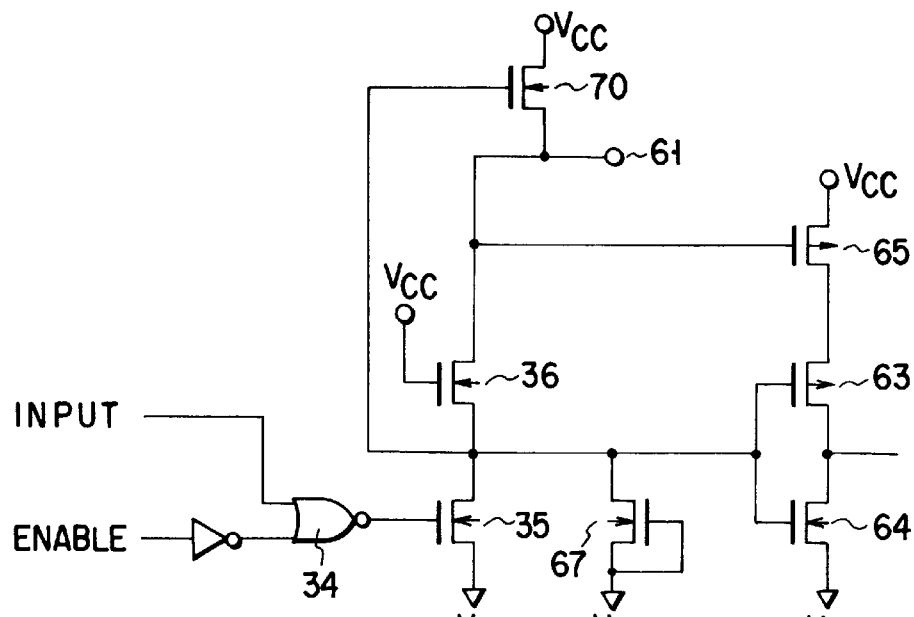
F I G. 69
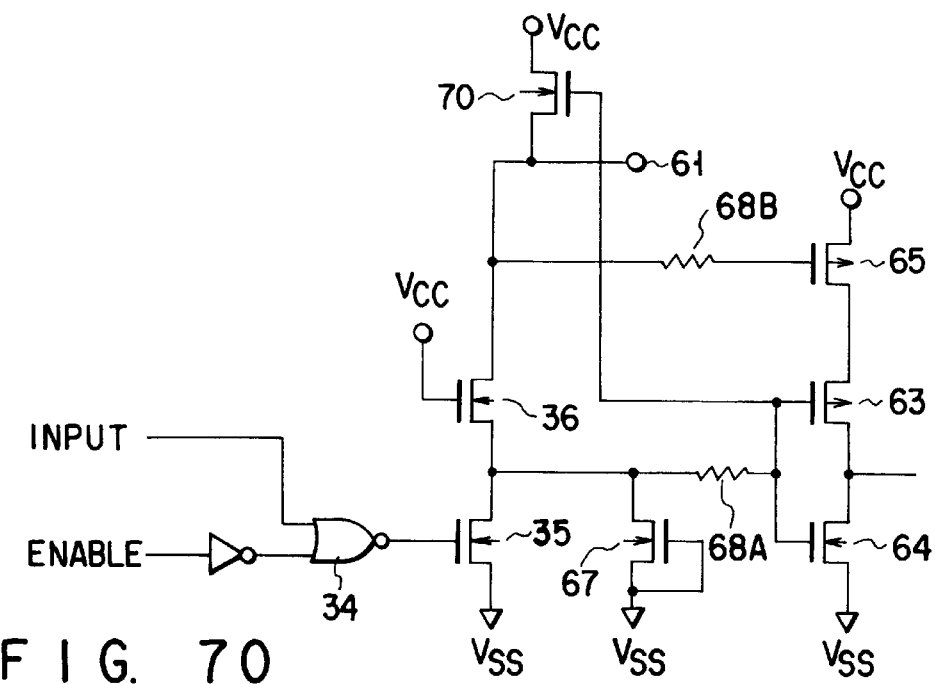
F I G. 70
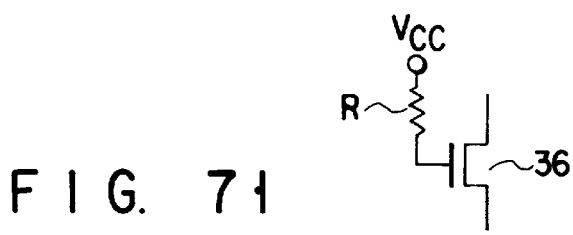
F I G. 71

INTERFACE CIRCUIT FOR USE IN A SEMICONDUCTOR INTEGRATED CIRCUIT

BACKGROUND OF THE INVENTION

1. Field of the Invention

This invention relates to a MOS semiconductor integrated circuit and more specifically to an interface circuit for an input circuit, an output circuit, or an input/output circuit, which provides protection against ESD.

2. Description of the Related Art

A MOS semiconductor integrated circuit is provided with a protection circuit for the purpose of protecting the gate oxide of a MOS transistor from breakdown (ESD: Electrostatic Destruction) based on a surge voltage applied to an external terminal.

FIG. 1 shows an example of an input protection circuit which is normally used. An input terminal 81 of a MOS semiconductor integrated circuit is connected by a protection circuit 82 to an input circuit 83. The input circuit 83 includes a MOS transistor 84. The protection circuit 82 is composed of a P-channel MOS transistor (hereinafter referred to as a PMOS) 85 the source-drain path of which is connected between a supply voltage Vcc and the input terminal 81, an N-channel MOS transistor (hereinafter referred to as an NMOS) 86 the source-drain path of which is connected between a reference supply voltage Vss and the input terminal 81, and a resistor 87 connected between the input terminal 81 and the input circuit 83. Normally the back gate of a PMOS is connected to its source, i.e., the supply voltage Vcc, while the back gate of an NMOS is connected to its source, i.e., the reference supply voltage Vss.

In the circuit thus arranged, when a surge voltage of positive polarity which is much higher than normal signal voltages is applied to the input terminal 81, it is passed to the supply voltage Vcc side through a parasitic PN diode that is present between the drain and back gate of the PMOS 85, protecting the gate oxide of the MOS transistor 84 in the input circuit 83 front breakdown. When, on the other hand, a surge voltage of negative polarity which is lower than 0V (the reference supply voltage Vss), i.e., the low level of normal signal voltages, is applied, it is passed to the Vss side through a parasitic PN junction present between the drain and back gate of the NMOS 86, protecting the gate oxide of the MOS transistor 84 from breakdown. Note that the resistor 87 in the protection circuit 82 is provided to form a CR type of lowpass filter with the gate capacitance of the MOS transistor 84 and so prevent a surge voltage from being applied to the gate of the MOS transistor 84 in the input circuit 83 immediately after application of the surge voltage to the input terminal 81.

FIG. 2 shows another example of an input protection circuit. In this example, an NMOS 88 is used in place of the PMOS 85 in the protection circuit 82 of FIG. 1. In this case, a positive surge voltage applied to the input terminal 81 is passed to the Vcc side by the transistor operation of an NPN parasitic bipolar transistor constructed from the source, drain and back gate of the NMOS 88. For a negative surge voltage the protection circuit 82 operates in the same manner as the protection circuit of FIG. 1.

With the advance of fine pattern processing techniques for semiconductor devices, on the other hand, the withstand voltages of MOS transistors have lowered. With the lowering of the withstand voltages, processes applied to devices adapted to 3.3V power supply system have appeared in addition to processes for devices based on 5V power supply system. No voltage for the 5V power supply system can be applied between the gate and the drain and between the gate and the source of devices manufactured by processes for the 3.3V power supply system. If, therefore, devices for 5V power supply system and devices for 3.3V power supply system are used in combination, then an interface circuit will be needed which permits signal transmission between a circuit for 5V supply system and a circuit for 3.3V supply system.

FIG. 3 shows an input circuit (an interface circuit) which is constructed by the use of a process adapted to 3.3V supply system and permits a signal adapted to 5V supply system to be entered. This circuit is described in "An 11-ns 8K×18 CMOS Static RAM with 0.5 µm Device" by D. T. Wong, et al, FIG. 15, IEEE J. Solid-state circuits, vol. 23, No. 5, October 1988. A signal adapted to 5V supply system applied to an input terminal 91 is applied to the common gates of a PMOS 93 and an NMOS 94 via the source-to-drain current path of an NMOS 92. The gate of the NMOS 92 is connected to the supply voltage Vcc of 3.3V system. Between the supply voltage Vcc and the source of the PMOS 93 is connected the source-to-drain current path of a PMOS 95 having its gate connected to the input terminal 91. The drains of the PMOS 93 and the NMOS 94 are connected together. A signal at their common drains is sent to the inside of an integrated circuit. The source of the NMOS 94 is connected to the reference supply voltage Vss.

In this circuit, since the gate of the NMOS 92 is supplied with the supply voltage Vcc (3.3V), even if a 5V signal is applied to input terminal 91, the voltage at node a which is connected to the common gates of PMOS 93 and NMOS 94 and corresponds to the source or drain of NMOS 92 will not go higher than (Vcc−Vtn) where Vtn represents the threshold voltage of NMOS 92. Thus, the 5V signal is not applied between the gate and source and between the gate and drain of NMOS 92. Such is the case with each of PMOS 93 and NMOS 94. Therefore, gate-oxide breakdown never occurs in all of MOS transistors. Note that PMOS 95 the gate of which is connected to input terminal 91 is provided so as to prevent a high through-current from flowing between Vcc and Vss terminals in the event that, for some reason, the voltage at node a becomes the intermediate level and PMOS 93 and NMOS 94 thus turn ON simultaneously. That is, it is when an input signal is at 5V that PMOS 93 must be turned OFF and, at this point, PMOS 95 is turned OFF, preventing such a through current from occurring.

FIG. 4 shows an input circuit which is different from the input circuit of FIG. 3. In this circuit, PMOS 95 that the circuit of FIG. 3 has is removed, but its basic operation remains unchanged from FIG. 3.

FIG. 5 shows an output circuit constructed by the use of a process for 3.3V supply system, which is described in "A 3.3V ASIC for Mixed Voltage Application with Shut Down Mode" by M. Ueda, et al., FIG. 1, IEEE 1993 CICC, 25.5.1. This circuit is arranged to output a signal INPUT based on 3.3V supply system from an output terminal 101 on the basis of an output enable signal ENABLE. When a signal at a high level is output from the output terminal 101, a PMOS 102 in the output stage is turned ON on the basis of signals INPUT and ENABLE. To output a low-level signal, on the other hand, an NMOS 103 in the output stage is turned ON. In order to prevent gate-oxide breakdown even when a 5V-supply system signal is applied to output terminal 101, the source-to-drain current path of an NMOS 104 is connected between output terminal 101 and the drain of NMOS 103. That essential part of the output circuit of FIG. 5 which is adapted to set output terminal 101 to the low level is indicated in FIG. 6.

In the circuit of FIG. 6, when a voltage of 5V is applied to output terminal 101 in the disable state where the signal ENABLE is set high, the voltage at node b connected to the drain of NMOS 103 and the source or drain of NMOS 104 will not go higher than (Vcc−Vtn) where Vtn represents the threshold voltage of NMOS 104 because a supply voltage Vcc of 3.3V is applied to the gate of NMOS 104. Thus, a voltage of 5V is not applied between the gate and drain of NMOS 103, preventing gate-oxide breakdown.

In the interface circuits of FIGS. 3, 4 and 5 as well, there is a need for some protection circuit against ESD. However, such approaches as shown in FIGS. 1 and 2 cannot be used. The reason will be described below.

FIG. 7 shows the combined use of the input circuit of FIG. 3 and the protection circuit of FIG. 1, while FIG. 8 shows the combined use of the input circuit of FIG. 3 and the protection circuit of FIG. 2. In FIGS. 7 and 8, like reference numerals are used to denote corresponding parts to those in FIG. 3 and their description is omitted.

When, in the circuit of FIG. 7, a voltage of 5V is applied to input terminal 91, the parasitic PN diode present between the drain and back gate of PMOS 85 is forward-biased, causing a large current to flow from the 5V supply to the 3.3V supply through that PN diode. This current may cause device breakdown. Further, when a voltage of 5V is applied to input terminal 91, this voltage is applied between the gate and drain of NMOS 86, causing gate-oxide breakdown in NMOS 86.

In the circuit of FIG. 8, when a voltage of 5V is applied to input terminal 91, this voltage is applied between the gate and drain of NMOS 88, causing gate-oxide breakdown. Likewise, a voltage of 5V is applied between the gate and drain of NMOS 86, causing gate-oxide breakdown.

Next, output circuits will be described. FIG. 9 shows the combined use of the output circuit of FIG. 5 and the protection circuit of FIG. 1, while FIG. 10 shows the combined use of the output circuit of FIG. 5 and the protection circuit of FIG. 2. Those essential parts of the output circuits of FIGS. 9 and 10 which set their output terminals 101 to the low level are indicated in FIGS. 11 and 12, respectively.

For the same reason as in the input circuits of FIGS. 7 and 8, in the circuits of FIGS. 11 and 12 as well, gate-oxide breakdown will occur in MOS transistors in the protection circuits when output terminal 101 is supplied with 5V.

Thus, integrated interface circuits which provide internal protection against a surge voltage applied to an external terminal have drawbacks that, when a signal voltage higher than an internal supply voltage is applied to the external terminal, a large current flows through a protection circuit itself and gate-oxide breakdown occurs in the protection circuit, destroying the protection circuit.

SUMMARY OF THE INVENTION

It is therefore an object of the invention to provide an interface circuit for use in a semiconductor integrated circuit which provides internal protection against a surge voltage applied to an external terminal and prevents the breakdown of a protection circuit even when a signal voltage higher than an internal supply voltage is applied to the external terminal.

According to an aspect of the present invention, there is provided an interface circuit for use in a semiconductor integrated circuit comprising: an external terminal; a first N-channel MOS transistor for suppressing a voltage having its source-to-drain current path connected at one end thereof to the external terminal and its gate connected to an internal supply voltage; and a protection circuit against surge voltage connected to the other end of the current path of the first N-channel MOS transistor.

According to another aspect of the present invention, there is provided an interface circuit for use in a semiconductor integrated circuit comprising: an external terminal; a first N-channel MOS transistor for suppressing a voltage having its source-to-drain current path connected at one end thereof to the external terminal and its gate connected to an internal supply voltage; a second N-channel MOS transistor for surge protection having its source-to-drain current path connected between the other end of the current path of the first MOS transistor and a reference supply voltage; and a third N-channel MOS transistor for surge protection having its source-to-drain current path connected between the internal supply voltage and the external terminal and its gate connected to the other end of the current path of the first N-channel MOS transistor.

According to still another aspect of the present invention, there is provided an interface circuit for use in a semiconductor integrated circuit comprising: an external terminal; a first N-channel MOS transistor for suppressing a voltage having its source-to-drain current path connected at one end thereof to the external terminal and its gate connected to an internal supply voltage; and a protection circuit against surge voltage connected between the other end of the current path of the first N-channel MOS transistor and an internal circuit.

According to a further aspect of the present invention, there is provided an interface circuit for use in a semiconductor integrated circuit comprising: an external terminal; a first N-channel MOS transistor for suppressing a voltage having its source-to-drain current path connected at its one end thereof to the external terminal and connected at its other end thereof to an internal circuit and its gate connected to an internal supply voltage; a second N-channel MOS transistor for suppressing a voltage having its source-to-drain current path connected at one end thereof to the external terminal and its gate connected to an internal supply voltage; and a surge protection circuit connected to the other end of the current path of the second N-channel transistor.

According to a still further aspect of the present invention, there is provided an interface circuit for use in a semiconductor integrated circuit comprising: an external terminal; a first N-channel MOS transistor for suppressing a voltage having its source-to-drain current path connected at one end thereof to the external terminal and its gate connected to an internal supply voltage; a first surge protection circuit connected between the other end of the current path of the first N-channel MOS transistor and an internal circuit; a second N-channel MOS-transistor for suppressing a voltage having its source-to-drain current path connected at one end thereof to the signal input terminal and its gate connected to the internal supply voltage; and a second surge protection circuit connected to the other end of the current path of the second N-channel MOS transistor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic diagram of an example of a normally used input protection circuit;

FIG. 2 is a schematic diagram of another example of a normally used input protection circuit;

FIG. 3 is a schematic diagram of an example of a conventional input circuit;

FIG. 4 is a schematic diagram of another example of a conventional input circuit;

FIG. 13 is a schematic diagram of an interface circuit according to a first embodiment of the present invention which is applied to an input circuit;

FIG. 14 is a schematic diagram of an interface circuit according to a second embodiment of the present invention which is applied to an input circuit;

FIG. 15 is a schematic diagram of an interface circuit according to a third embodiment of the present invention which is applied to an input circuit;

FIG. 16 is a schematic diagram of an interface circuit according to a fourth embodiment of the present invention which is applied to an input circuit;

FIG. 17 is a schematic diagram of an interface circuit according to a fifth embodiment of the present invention which is applied to an input circuit;

FIG. 18 is a schematic diagram of an interface circuit according to a sixth embodiment of the present invention which is applied to an input circuit;

FIG. 19 is a schematic diagram of an interface circuit according to a seventh embodiment of the present invention which is applied to an input circuit;

FIG. 20 is a schematic diagram of an interface circuit according to an eighth embodiment of the present invention which is applied to an input circuit;

FIG. 21 is a schematic diagram of an interface circuit according to a ninth embodiment of the present invention which is applied to an input circuit;

FIG. 22 is a schematic diagram of an interface circuit according to a tenth embodiment of the present invention which is applied to an input circuit;

FIG. 23 is a schematic diagram of an interface circuit according to an eleventh embodiment of the present invention which is applied to an input circuit;

FIG. 24 is a schematic diagram of an interface circuit according to a twelfth embodiment of the present invention which is applied to an input circuit;

FIG. 25 is a schematic diagram of an interface circuit according to a thirteenth embodiment of the present invention which is applied to an input circuit;

FIG. 26 is a schematic diagram of an interface circuit according to a fourteenth embodiment of the present invention which is applied to an input circuit;

FIG. 27 is a schematic diagram of an interface circuit according to a fifteenth embodiment of the present invention which is applied to an input circuit;

FIG. 28 is a schematic diagram of an interface circuit according to a sixteenth embodiment of the present invention which is applied to an input circuit;

FIG. 29 is a schematic diagram of an interface circuit according to a seventeenth embodiment of the present invention which is applied to an input circuit;

FIG. 30 is a schematic diagram of an interface circuit according to an eighteenth embodiment of the present invention which is applied to an input circuit;

FIG. 31 is a schematic diagram of an interface circuit according to a nineteenth embodiment of the present invention which is applied to an input circuit;

FIG. 32 is a schematic diagram of an interface circuit according to a twentieth embodiment of the present invention which is applied to an input circuit;

FIG. 33 is a schematic diagram of an interface circuit according to a twenty-first embodiment of the present invention which is applied to an input circuit;

FIG. 34 is a schematic diagram of an interface circuit according to a twenty-second embodiment of the present invention which is applied to an input circuit;

FIG. 35 is a schematic diagram of an interface circuit according to a twenty-third embodiment of the present invention which is applied to an input circuit;

FIG. 36 is a schematic diagram of an interface circuit according to a twenty-fourth embodiment of the present invention which is applied to an input circuit;

FIG. 37 is a schematic diagram of an interface circuit according to a twenty-fifth embodiment of the present invention which is applied to an input circuit;

FIG. 38 is a schematic diagram of an interface circuit according to a twenty-sixth embodiment of the present invention which is applied to an input circuit;

FIG. 39 is a schematic diagram of an interface circuit according to a twenty-seventh embodiment of the present invention which is applied to an input circuit;

FIG. 40 is a schematic diagram of an interface circuit according to a twenty-eighth embodiment of the present invention which is applied to an input circuit;

FIG. 46 is a schematic diagram of an interface circuit according to a thirty-fourth embodiment of the present invention which is applied to an input circuit;

FIG. 47 is a schematic diagram of an interface circuit according to a thirty-fifth embodiment of the present invention which is applied to an input circuit;

FIG. 48 is a schematic diagram of an interface circuit according to a thirty-sixth embodiment of the present invention which is applied to an input circuit;

FIG. 55 is a schematic diagram of an interface circuit according to a forty-third embodiment of the present invention which is applied to an output circuit;

FIG. 56 is a schematic diagram of an interface circuit according to a forty-fourth embodiment of the present invention which is applied to an input circuit;

FIG. 63 is a schematic diagram of an interface circuit according to a forty-seventh embodiment of the present invention;

FIG. 64 is a schematic diagram of an interface circuit according to a forty-eighth embodiment of the present invention;

FIG. 65 is a schematic diagram of an interface circuit according to a forty-ninth embodiment of the present invention which is applied to an input/output circuit;

FIG. 69 is a schematic diagram of an interface circuit according to a fifty-third embodiment of the present invention which is applied to an input/output circuit;

FIG. 70 is a schematic diagram of an interface circuit according to a fifty-fourth embodiment of the present invention which is applied to an input/output circuit; and FIG. 71 is a schematic diagram of a modification of the interface circuits according to the respective embodiments of the present invention.

DETAILED DESCRIPTION OF THE PREFERRED EMBODIMENTS

Figure 5:
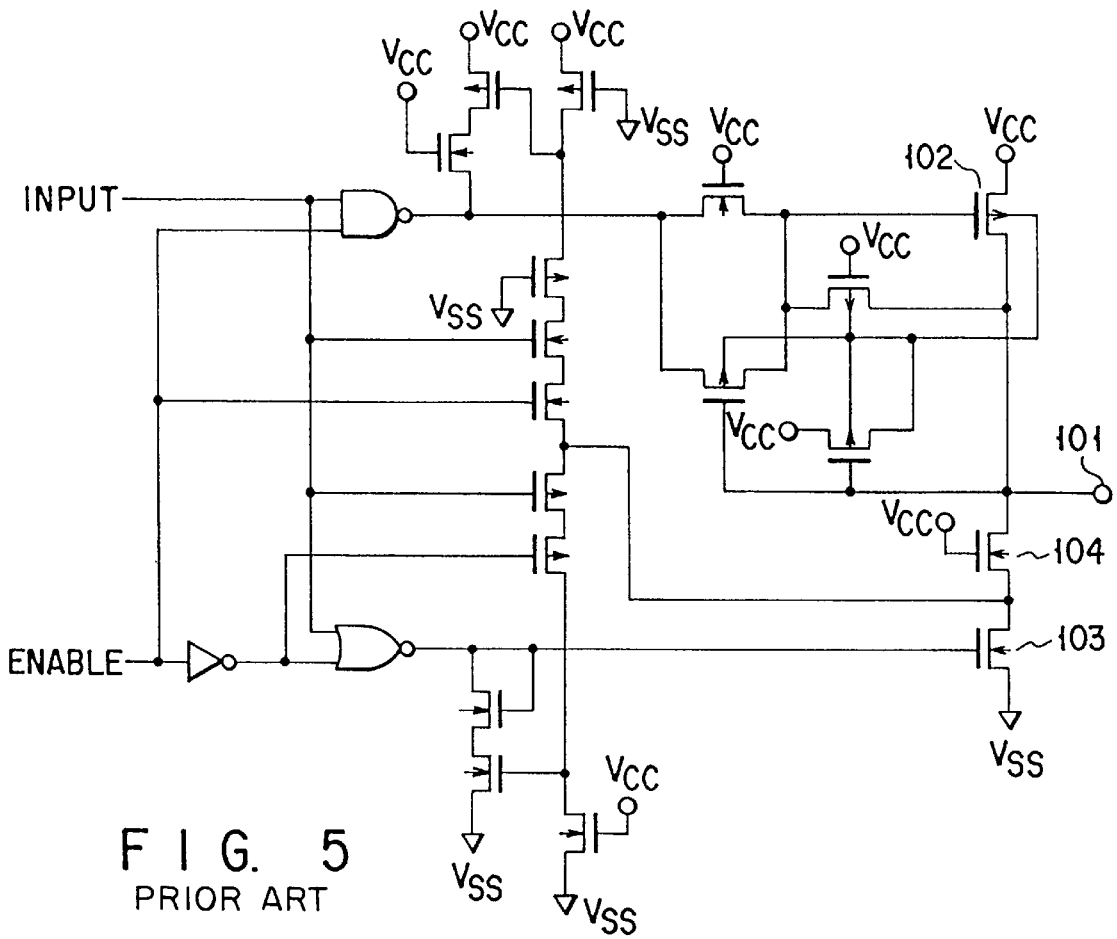
FIG. 5 is a schematic diagram of an example of a conventional output circuit.
Figure 6:
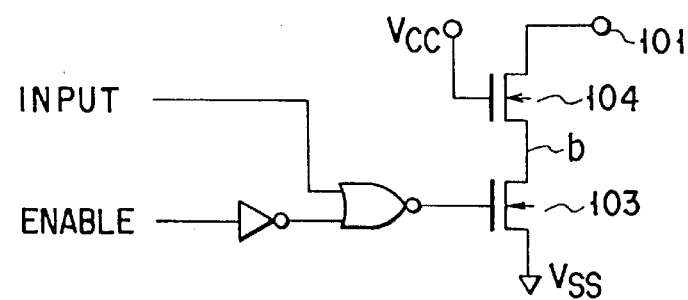
FIG. 6 shows an essential part of the output circuit of FIG. 5.
Figure 7:
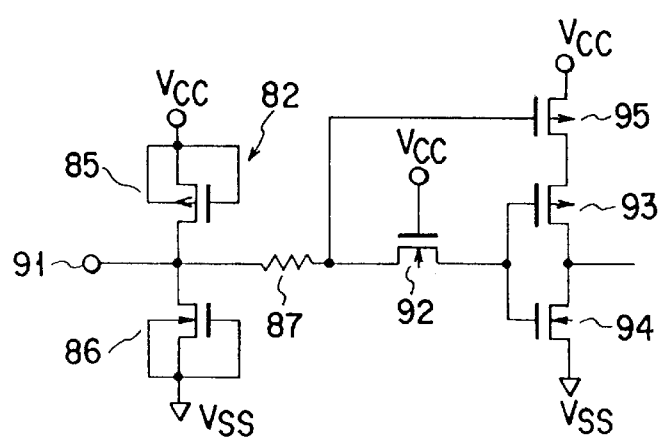
FIG. 7 shows a circuit in which the input circuit of FIG. 3 and the protection circuit of FIG. 1 are used in combination.
Figure 8:
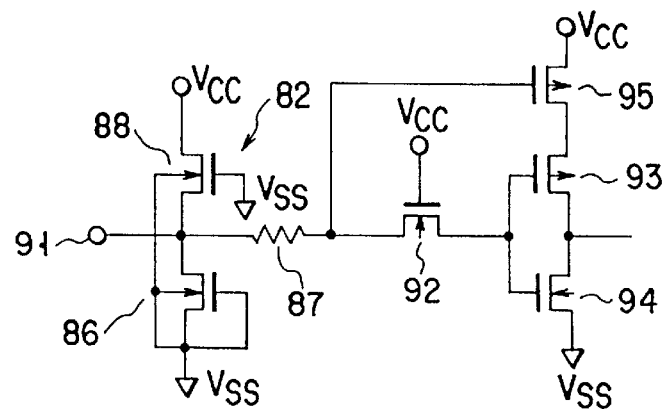
FIG. 8 shows a circuit in which the input circuit of FIG. 3 and the protection circuit of FIG. 2 are used in combination.
Figure 9:
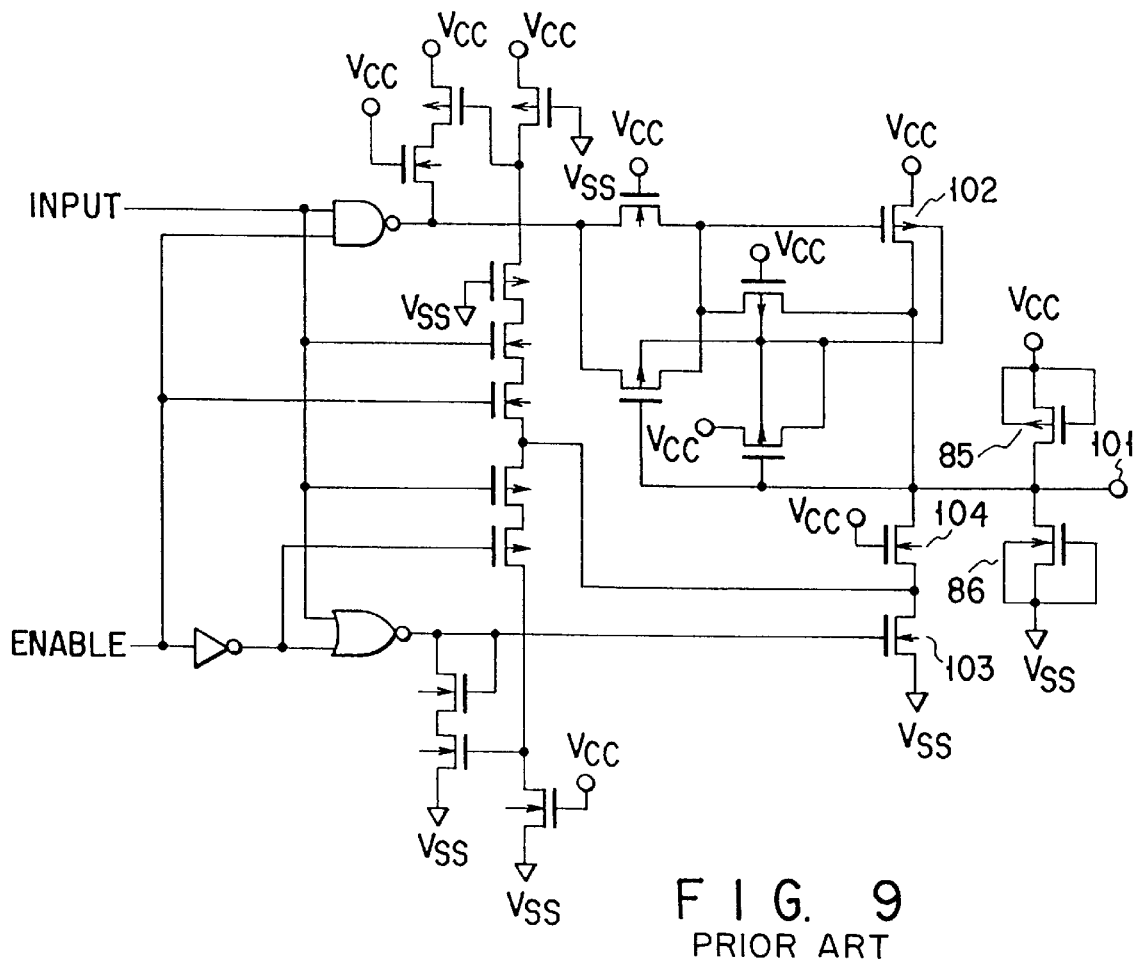
FIG. 9 shows a circuit in which the output circuit of FIG. 5 and the protection circuit of FIG. 1 are used in combination.
Figure 10:
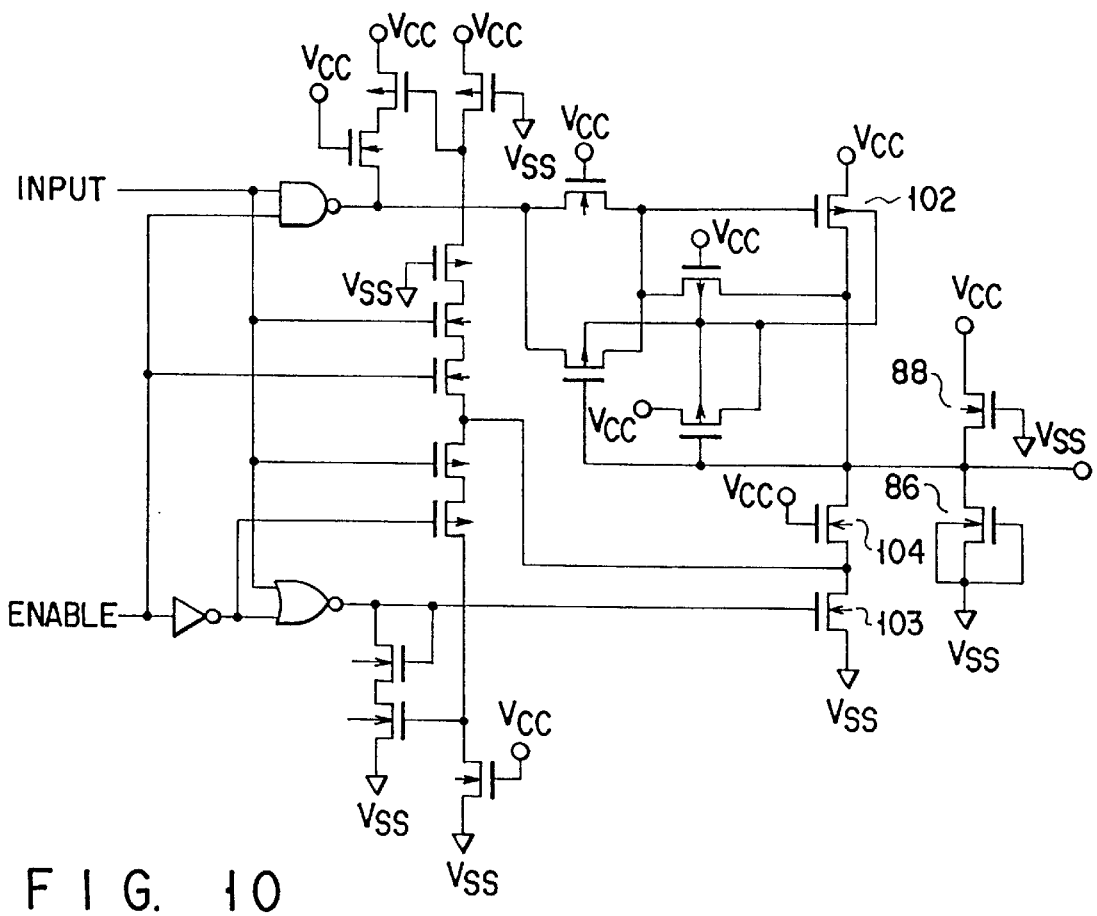
FIG. 10 shows a circuit in which the output circuit of FIG. 5 and the protection circuit of FIG. 2 are used in combination.
Figure 11:
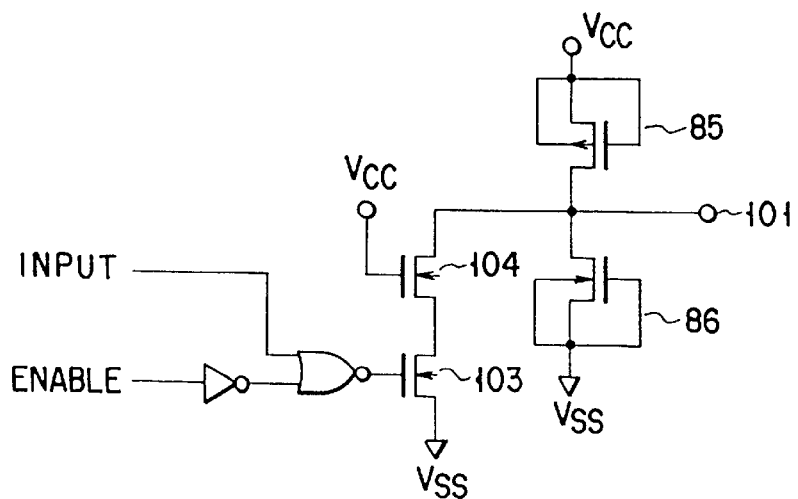
FIG. 11 shows an essential part of the output circuit of FIG. 9.
Figure 12:
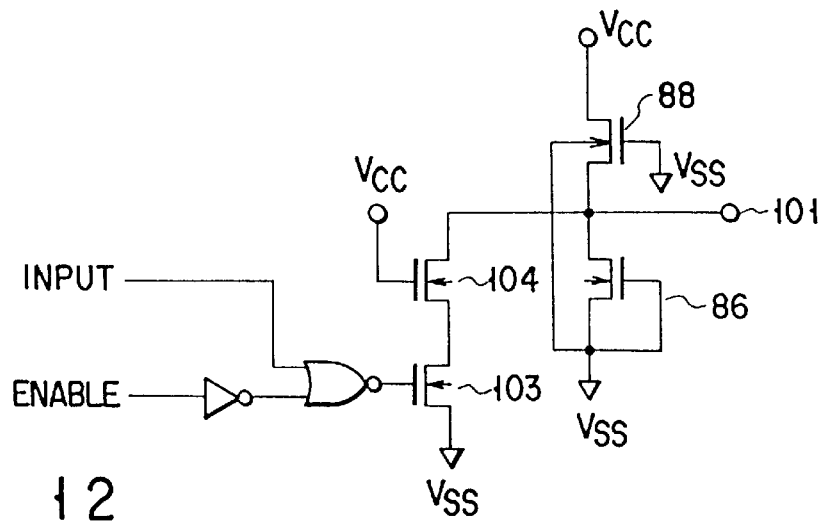
FIG. 12 shows an essential part of the output circuit of FIG. 10.

Referring now to FIG. 13, there is shown an interface circuit according to a first embodiment of the invention which is applied to an input circuit which is constructed by the use of a process for 3.3V supply system and permits entry of signals for 5V supply system. To an input terminal 11 is connected an end of the source-to-drain current path of a voltage suppression NMOS 12, which has its gate connected to a 3.3V-system supply voltage Vcc. The other end of the current path of NMOS 12 is connected by a protection circuit 13 to the common gates of a PMOS 14 and an NMOS 15 in the input stage of an internal circuit. The protection circuit 13 comprises a PMOS 16 and an NMOS 17. The PMOS 16 has its source and gate connected together to supply voltage Vcc and its drain connected to the common gates of PMOS 14 and NMOS 15. The NMOS 17 has its source and gate connected together to a reference voltage supply Vss and its drain connected to the common gates of PMOS 14 and NMOS 15. The PMOS 14 and NMOS 15 in the input stage are joined at their drains and a signal taken at the common drains is fed into the inside of the integrated circuit. The source of NMOS 15 is connected to the reference supply voltage Vss. Between the supply voltage Vcc and the source of PMOS 14 is connected the source-to-drain current path of a PMOS 18, which has its gate connected to input terminal 11.

That is, the feature of the circuit is that the source-drain path of voltage suppression NMOS 12 is disposed between input terminal 11 and protection circuit 13. Note here that, though not shown, the back gates of PMOSs and NMOSs are connected to their respective sources. Such is the case with other embodiments to be described later.

In the input circuit thus arranged, when a 5V signal is applied to input terminal 11, the voltage at one of the source and drain of NMOS 12 that is connected to protection circuit 13 will not go higher than (Vcc−Vtn) where Vtn is the threshold voltage of NMOS 12 because the gate of NMOS 12 is connected to the 3.3V supply voltage Vcc. Thus, a voltage of 5V is not applied between the gate and source and between the gate and drain of NMOS 12. Likewise, a voltage of 5V is not impressed between the gate and source and between the gate and drain of each of PMOSs 14, 16 and NMOSs 15, 17. For this reason, none of the MOS transistors, including the transistors in the protection circuit, suffer gate-oxide breakdown. In this example as well, since PMOS 18 the gate of which is controlled by a signal at input terminal 11 is connected between PMOS 14 and Vcc, no through-current will flow between Vcc and Vss.

When a surge voltage is applied to input terminal 11, on the other hand, it is transmitted to the other end of the current path of NMOS 12 via NMOS 12 and a parasitic NPN bipolar transistor consisting of the source, back gate and drain of NMOS 12 and then passed to the supply voltage Vcc or Vss through the parasitic PN diode present between the drain and back gate of PMOS 16 or NMOS 17 in protection circuit 13. Consequently, the internal circuit can be protected from ESD.

FIGS. 14 and 15 show interface circuits according to second and third embodiments of the invention which are applied to an input circuit. The input circuit of FIG. 14 is distinct from the circuit of FIG. 13 in that a resistor 19, which is equivalent in function to protection resistor 87 shown in FIGS. 1 and 2, is connected between input terminal 11 and the connection point between the one end of the current path of NMOS 12 and the gate of PMOS 18. In the input circuit of FIG. 15, two separate resistors 19A and 19B are used in place of protection resistor 19 in the circuit of FIG. 14, resistor 19A being connected between input terminal 11 and NMOS 12 and resistor 19B being connected between input terminal 11 and the gate of PMOS 18.

In the circuits of FIGS. 14 and 15, each protection resistor and its associated MOS transistor's gate capacitance form a CR type of lowpass filter. When a surge voltage is applied to input terminal 11, the lowpass filter prevents it from being applied to protection circuit 13 immediately, thus further increasing the resistance to ESD breakdown.

FIG. 16 shows an interface circuit according to a fourth embodiment of the invention which is applied to an input circuit which is constructed by the use of a process for 3.3V supply system and permits entry of signals of 5V supply system. This circuit is distinct from the circuit of FIG. 13 in that PMOS 16 in protection circuit 13 is replaced with an NMOS 20, which has its drain connected to the supply voltage Vcc, its source connected to the common gates of PMOS 14 and NMOS 15 and its gate connected to the reference supply voltage Vss.

The circuit thus arranged is distinct from the circuit of FIG. 13 in that, when a positive surge voltage is applied to input terminal 11, it is passed to Vcc by the transistor action of a parasitic NPN bipolar transistor consisting of the source, back gate and drain of NMOS 20 in protection circuit 13.

FIGS. 17 and 18 show interface circuits according to fifth and sixth embodiments of the invention which are applied to an input circuit. The input circuit of FIG. 17 is distinct from the circuit of FIG. 16 in that a protection resistor 19, which is equivalent in function to protection resistor 87 shown in FIGS. 1 and 2, is connected between input terminal 11 and the connection point between the one end of the current path of NMOS 12 and the gate of PMOS 18. In the input circuit of FIG. 18, two separate resistors 19A and 19B are used in place of protection resistor 19 in the circuit of FIG. 17, resistor 19A being connected between input terminal 11 and NMOS 12 and resistor 19B being connected between input terminal 11 and the gate of PMOS 18.

With the circuits of FIGS. 17 and 18, it is possible to prevent a surge voltage applied to input terminal 11 from being applied to protection circuit 13 immediately for the same reason as described previously, thus further increasing the resistance to ESD breakdown.

FIG. 19 shows an interface circuit according to a seventh embodiment of the invention which is applied to an input circuit which is constructed by the use of a process for 3.3V supply system and permits entry of signals for 5V supply system as with the circuit of FIG. 4.

That is, this circuit is distinct from the circuit of FIG. 13 in that PMOS 18 is omitted. Thus, the advantages of the circuit remain unchanged from those of the circuit of FIG. 13.

FIG. 20 shows an interface circuit according to an eighth embodiment of the invention which is applied to an input circuit. This circuit is distinct from the circuit of FIG. 19 in that a protection resistor 19 is connected between input terminal 11 and NMOS 12. For the same reason as in the embodiments of FIGS. 14, 15, 17 and 18, this circuit can prevent a surge voltage applied to input terminal 11 from being applied to protection circuit 13 immediately, thus further increasing the resistance to ESD breakdown.

FIG. 21 shows an interface circuit according to a ninth embodiment of the invention which is applied to an input circuit which is constructed by the use of a process for 3.3V supply system and permits entry of signals for 5V supply system. This circuit is distinct from the circuit of FIG. 16 in that PMOS 18 is omitted. Thus, the advantage is substantially the same as that of the circuit of FIG. 16.

FIG. 22 shows an interface circuit according to a tenth embodiment of the invention which is applied to an input circuit. This circuit is distinct from the circuit of FIG. 21 in that a protection resistor 19 is connected between input terminal 11 and one end of the current path of NMOS 12. This circuit can prevent a surge voltage applied to input terminal 11 from being impressed to protection circuit 13 immediately for the same reason as in the circuits of FIGS. 14, 15, 17 and 18, thus further increasing the resistance to ESD breakdown.

FIG. 23 shows an interface circuit according to an eleventh embodiment of the invention which is applied to an input circuit which is constructed by the use of a process for 3.3V supply system and permits entry of signals for 5V supply system. To input terminal 11 is connected one end of the source-to-drain current path of a first NMOS 12A used for voltage suppression, which has its gate connected to 3.3V system supply voltage Vcc. The other end of the current path of NMOS 12A is connected by a first protection circuit 13A to the common gates of PMOS 14 and NMOS 15 in the input stage of the internal circuit. First protection circuit 13A comprises a PMOS 16A and an NMOS 17A. PMOS 16A has its source and gate connected to supply voltage Vcc and its drain connected to the common gates of PMOS 14 and NMOS 15, while NMOS 17A has its source and gate connected to reference supply voltage Vss and its drain connected to the common gates of PMOS 14 and NMOS 15. The drains of PMOS 14 and NMOS 15 in the input stage are connected to each other. A signal at the common drains of PMOS 14 and NMOS 15 is fed to the inside of the integrated circuit. The source of NMOS 15 is connected to the reference supply voltage Vss. Between the supply voltage Vcc and the source of PMOS 14 is connected the source-to-drain current path of a PMOS 18, which has its gate connected to input terminal 11.

To input terminal 11 is connected one end of the source-to-drain current path of a second voltage suppression NMOS 12B, which has its gate connected to the 3.3V system supply voltage Vcc. To the other end of the current path of NMOS 12B is connected a second protection circuit 13B which comprises a PMOS 16B and an NMOS 17B as in first protection circuit 13A. In this protection circuit, PMOS 16B has its source and gate connected to supply voltage Vcc and its drain connected to the other end of the current path of NMOS 12B, while NMOS 17B has its source and gate connected to reference supply voltage Vss and its drain connected to the other end of the current path of NMOS 12B.

That is, the features of the circuit of FIG. 23 are that first and second NMOSs 12A and 12B are used as voltage suppression NMOSs, the source-to-drain current path of first NMOS 12A is disposed between input terminal 11 and first protection circuit 13A, and the source-to-drain current path of second NMOS 12B is disposed between input terminal 11 and second protection circuit 13B.

In the input circuit thus arranged, when a 5V signal is applied to input terminal 11, the voltage at each of those sources or drains of NMOSs 12A and 12B which are respectively connected to first and second protection circuits 13A and 13B will not go higher than (Vcc−Vtn) where Vtn is the threshold voltage of NMOSs 12A and 12B because the gates of NMOSs 12A and 12B are each connected to the the supply voltage Vcc of 3.3V. Thus, a voltage of 5V is not applied between the gate and source and between the gate and drain of each of NMOSs 12A and 12B. Likewise, a voltage of 5V is not impressed between the gate and source and between the gate and drain of each of PMOSs 14, 16A and 16B and NMOSs 15, 17A and 17B. For this reason, none of the MOS transistors, including the transistors in first and second protection circuits 13A and 13B, suffer gate-oxide breakdown.

When a surge voltage is applied to input terminal 11, on the other hand, it is passed to the supply voltage Vcc or the reference supply voltage Vss through second NMOS 12B and a parasitic PN diode present between the drain and back gate of PMOS 16B or a parasitic PN diode present between the drain and the back gate of NMOS 17B in second protection circuit 13B, thus protecting the internal circuit from ESD breakdown.

In the circuit of FIG. 23, since second protection circuit 13B protects the internal circuit from ESD breakdown, first protection circuit 13A is merely used as a supplement. Thus, the MOS transistors in first protection circuit 13A can be made small in comparison with those in second protection circuit 13B. Alternatively, first protection circuit 13A may be omitted as in the fourteenth embodiment circuit shown in FIG. 26.

FIGS. 24 and 25 show interface circuits according to twelfth and thirteenth embodiments of the invention which are each applied to an input circuit. The input circuit of FIG. 24 is distinct from the circuit of FIG. 23 in that a protection resistor 19 is connected between input terminal 11 and the connection point between the gate of PMOS 18 and the source-to-drain current path of each of first and second NMOSs 12A and 12B. In the input circuit of FIG. 25, two separate resistors 19A and 19B are used in place of protection resistor 19 used in the circuit of FIG. 24, resistor 19A being connected between input terminal 11 and first NMOS 12A and resistor 19B being connected between input terminal 11 and the gate of PMOS 18.

For the same reason described in connection with the embodiments of FIGS. 14 and 15, the embodiments of FIGS. 24 and 25 as well can prevent a surge voltage applied to input terminal 11 from being impressed to protection circuit 13A and the like immediately, thus further increasing resistance to ESD breakdown.

As with the eleventh embodiment, in the twelfth and thirteenth embodiments, since second protection circuit 13B protects the internal circuit from ESD breakdown, first protection circuit 13A is merely used as a supplement. Thus, the MOS transistors in first protection circuit 13A can be made small in comparison with those in second protection circuit 13B. Alternatively, first protection circuit 13A may be omitted as in a fifteenth embodiment circuit shown in FIG. 27 or a sixteenth embodiment circuit shown in FIG. 28.

FIG. 29 shows an interface circuit according to a seventeenth embodiment of the invention which is applied to an input circuit which is constructed by the use of a process for 3.3V supply system and permits entry of signals for 5V supply system. This circuit is distinct from the circuit of FIG. 23 in that PMOSs 16A and 16B in first and second protection circuits 13A and 13B are replaced with NMOSs 20A and 20B, respectively. NMOS 20A has its drain connected to the supply voltage Vcc, its source connected to the common gates of PMOS 14 and NMOS 15, and its gate connected to the reference supply voltage Vss. NMOS 20B has its drain connected to the supply voltage Vcc, its source connected to the connection point of NMOSs 12B and 17B, and its gate connected to the reference supply voltage Vss.

The circuit thus arranged is distinct from the circuit of FIG. 23 in that, when a surge voltage of positive polarity is applied to input terminal 11, it is passed to Vcc by the transistor action of an NPN parasitic bipolar transistor consisting of the source, back gate and drain of each of NMOSs 20A and 20B in protection circuits 13A and 13B.

In this embodiment, since second protection circuit 13B protects the internal circuit from ESD breakdown, first protection circuit 13A is used as a supplement. Thus, the MOS transistors in first protection circuit 13A can be made small in comparison with those in second protection circuit 13B. Alternatively, first protection circuit 13A may be omitted as in a twentieth embodiment circuit shown in FIG. 32.

FIGS. 30 and 31 show interface circuits according to eighteenth and nineteenth embodiments of the invention which are each applied to an input circuit. The input circuit of FIG. 30 is distinct from the circuit of FIG. 29 in that a protection resistor 19 is connected between input terminal 11 and the connection point between the gate of PMOS 18 and one end of the source-drain path of each of first and second NMOSs 12A and 12B. In the input circuit of FIG. 31, two separate resistors 19A and 19B are used instead of protection resistor 19 used in the circuit of FIG. 30, resistor 19A being connected between input terminal 11 and NMOS 12A and resistor 19B being connected between input terminal 11 and the gate of PMOS 18.

As with the seventeenth embodiment circuit, in the eighteenth and nineteenth embodiment circuits, since second protection circuit 13B protects the internal circuit from ESD breakdown, first protection circuit 13A is used as a supplement. Thus, the MOS transistors in first protection circuit 13A can be made small in comparison with those in second protection circuit 13B. Alternatively, first protection circuit 13A may be omitted as in a twenty-first embodiment circuit shown in FIG. 33 or a twenty-second embodiment circuit shown in FIG. 34.

FIG. 35 shows an interface circuit according to a twenty-third embodiment of the invention which is applied to an input circuit which is constructed by the use of a process for 3.3V supply system and permits entry of signals for 5V supply system. This circuit is distinct from the circuit of FIG. 23 in that PMOS 18A is omitted and PMOS 16A in first protection circuit 13A is replaced with an NMOS 20A. NMOS 20A has its drain connected to the supply voltage Vcc, its source connected to the common gates of PMOS 14 and NMOS 15, and its gate connected to the reference supply voltage Vss. Thus, first and second protection circuits 13A and 13B may differ from each other in arrangement.

In this embodiment, since second protection circuit 13B protects the internal circuit from ESD breakdown, first protection circuit 13A is merely used as a supplement. Thus, the MOS transistors in first protection circuit 13A can be made small in comparison with those in second protection circuit 13B. Alternatively, first protection circuit 13A may be omitted as in a twenty-fifth embodiment circuit shown in FIG. 37.

FIG. 36 shows an interface circuit according to a twenty-fourth embodiment of the invention which is applied to an input circuit. This circuit is distinct from the circuit of FIG. 35 in that a protection resistor 19 is connected between input terminal 11 and one end of the current path of NMOS 12A. This circuit can prevent a surge voltage applied to input terminal 11 from being impressed to protection circuit 13A immediately for the same reason as in the circuit of FIG. 14, thus further increasing the resistance to ESD breakdown.

As with the twenty-third embodiment, in this embodiment, since second protection circuit 13B protects the internal circuit from ESD breakdown, first protection circuit 13A is merely used as a supplement. Thus, the MOS transistors in first protection circuit 13A can be made small in comparison with those in second protection circuit 13B. Alternatively, first protection circuit 13A may be omitted as in a twenty-sixth embodiment circuit shown in FIG. 38.

FIG. 39 shows an interface circuit according to a twenty-seventh embodiment of the invention which is applied to an input circuit. This circuit is distinct from the circuit of FIG. 35 in that PMOS 16B in second protection circuit 13B is replaced with an NMOS 20B. NMOS 20B has its drain connected to supply voltage Vcc, its source connected to the connection point of NMOSs 12B and 17B, and its gate connected to reference supply voltage Vss.

Figure 41:
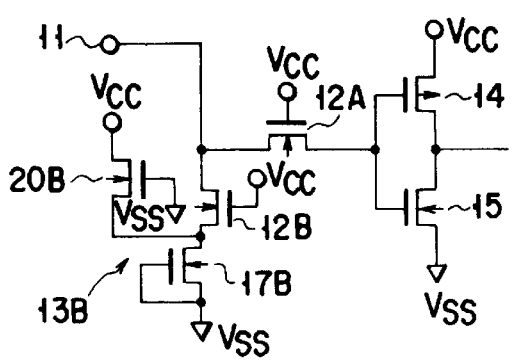
FIG. 41 is a schematic diagram of an interface circuit according to a twenty-ninth embodiment of the present invention which is applied to an input circuit.

In this embodiment as well, since second protection circuit 13B protects the internal circuit from ESD breakdown, first protection circuit 13A is merely used as a supplement. Thus, it is allowed to make the MOS transistors in first protection circuit 13A small in comparison with those in second protection circuit 13B. Alternatively, first protection circuit 13A may be omitted as in a twenty-ninth embodiment circuit shown in FIG. 41.

FIG. 40 shows an interface circuit according to a twenty-eighth embodiment of the invention which is applied an input circuit. This circuit is distinct from the circuit of FIG. 39 in that a protection resistor 19 is connected between input terminal 11 and one end of the current path of first NMOS 12A. This circuit can prevent a surge voltage applied to input terminal 11 from being impressed to protection circuit 13A immediately for the same reason as in the circuit of FIG. 14, thus further increasing the resistance to ESD breakdown.

Figure 42:
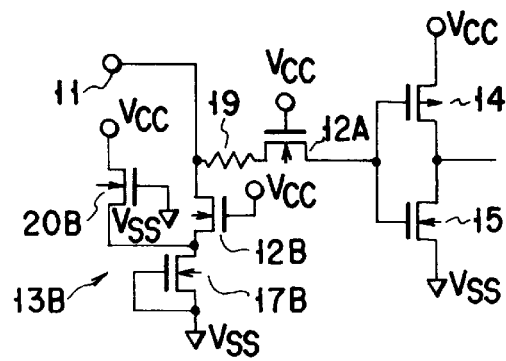
FIG. 42 is a schematic diagram of an interface circuit according to a thirtieth embodiment of the present invention which is applied to an input circuit.

As with the twenty-seventh embodiment, in the twenty-eighth embodiment, since second protection circuit 13B protects the internal circuit from ESD breakdown, first protection circuit 13A is merely used as a supplement. Thus, the MOS transistors in first protection circuit 13A can be made small in comparison with those in second protection circuit 13B. Alternatively, first protection circuit 13A may be omitted as in a thirtieth embodiment circuit shown in FIG. 42.

Figure 43:
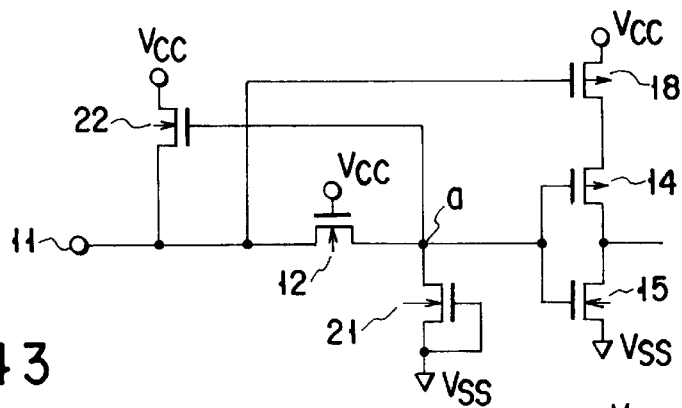
FIG. 43 is a schematic diagram of an interface circuit according to a thirty-first embodiment of the present invention which is applied to an input circuit.

FIG. 43 shows an interface circuit according to a thirty-first embodiment of the invention which is applied to an input circuit which, as with the circuit of FIG. 3, is constructed by the use of a process adapted to 3.3V supply system and permits entry of signals adapted to 5V supply system. To input terminal 11 is connected one end of the source-to-drain current path of voltage suppression NMOS 12 the gate of which is connected to 3.3V supply voltage Vcc. The other end of NMOS 12 is connected to the common gates of PMOS 14 and NMOS 15 in the input stage of the internal circuit. PMOS 14 and NMOS 15 have their drains connected together and NMOS 15 has its source connected to reference supply voltage Vss. A signal at the common drains of PMOS 14 and NMOS 15 is fed to the inside of the integrated circuit. Between supply voltage Vcc and the source of PMOS 14 is connected the source-to-drain current path of PMOS 18, which has its gate connected to input terminal 11.

To the other end of the current path of NMOS 12 is connected the drain of NMOS 21, which has its source and gate connected to reference supply voltage Vss. Further, to input terminal 11 is connected the source of NMOS 22, which has its drain connected to supply voltage Vcc and its gate connected to node a, i.e., the connection point of NMOSs 12 and 21.

That is, the features of the circuit are that the source-to-drain current path of voltage suppression NMOS 12 is disposed between input terminal 11 and the input stage of the internal circuit, NMOS 21 is connected between the other end of the current path of NMOS 12 and Vss, and an NMOS 22 is connected between input terminal 11 and Vcc, the gate of which is connected to receive a signal that passed through NMOS 12.

In the input circuit thus arranged, when a surge voltage of negative polarity is applied to input terminal 11, it is passed to the reference supply voltage Vss through NMOS 12 and a parasitic PN diode present between the drain and the back gate of NMOS 21.

As long as a signal voltage at input terminal 11 is in the range of Vss to Vcc, on the other hand, NMOS 12 will never turn ON. The reason is that, since the gate of NMOS 12 is fixed at Vcc, the voltage Va at node a to which the other end of the current path of NMOS 12 and NMOSs 21 and 22 are connected is ($0 \leq Va \leq Vcc-Vtn$) where Vtn is the threshold voltage of NMOS 12. And, when a signal voltage applied to input terminal 11 is Vcc (high level), the gate-to-source voltage Vgs of NMOS 22 is Vgs=0, so that NMOS 22 turns OFF. Thus, a voltage of 5V will never be applied to the input stage of the internal circuit.

When a positive surge voltage higher than the supply voltage Vcc is applied to input terminal 11, it is passed to Vcc through NMOS 22 and a parasitic NPN bipolar transistor formed of the drain, back gate, and source of NMOS 22. Even if, therefore, a surge voltage is applied to input terminal 11, gate-oxide breakdown will not occur though the source of NMOS 22 is connected to input terminal 11.

Figure 44:
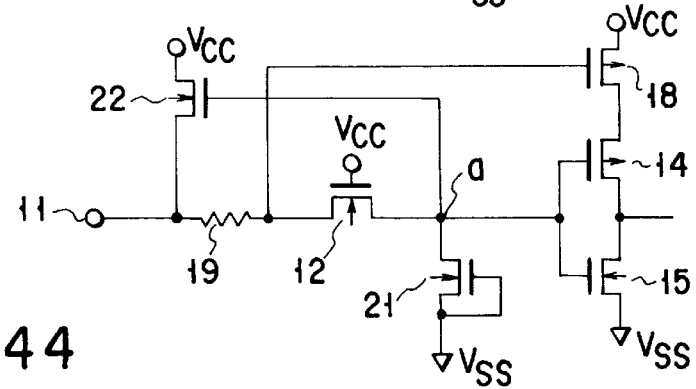
FIG. 44 is a schematic diagram of an interface circuit according to a thirty-second embodiment of the present invention which is applied to an input circuit.
Figure 45:
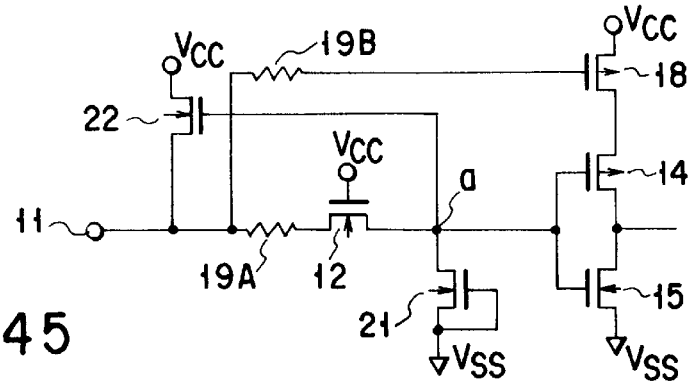
FIG. 45 is a schematic diagram of an interface circuit according to a thirty-second embodiment of the present invention which is applied to an input circuit.

FIGS. 44 and 45 show interface circuits according to thirty-second and thirty-third embodiments of the invention which are each applied to an input circuit. The input circuit of FIG. 44 is distinct from the circuit of FIG. 43 in that a protection resistor 19 is connected between input terminal 11 and one end of the current path of NMOS 12. In the input circuit of FIG. 45, two separate resistors 19A and 19B are used instead of protection resistor 19 used in the circuit of FIG. 44, resistor 19A being connected between input terminal 11 and NMOS 12A and resistor 19B being connected between input terminal 11 and the gate of PMOS 18.

The thirty-second and thirty-third embodiment circuits of FIGS. 44 and 45 can prevent a surge voltage applied to input terminal 11 from being impressed to voltage suppression NMOS 12 and the internal circuit immediately, thus further increasing the resistance to ESD breakdown.

FIG. 46 shows an interface circuit according to a thirty-fourth embodiment of the invention which is applied to an input circuit which, as with the circuit of FIG. 3, is constructed by the use of a process adapted to 3.3V supply system and permits entry of signals adapted to 5V supply system. To input terminal 11 is connected one end of the source-to-drain current path of a first voltage suppression NMOS 12A the gate of which is connected to 3.3V supply voltage Vcc. To the other end of the current path of NMOS 12A is connected the drain of an NMOS 21A for protection against ESD, which has its source and gate connected to reference supply voltage Vss. The other end of the current path of NMOS 12A is connected to the common gates of PMOS 14 and NMOS 15 in the input stage of the internal circuit. PMOS 14 and NMOS 15 have their drains connected together and NMOS 15 has its source connected to reference supply voltage Vss. A signal at the common drains of PMOS 14 and NMOS 15 is fed to the inside of the integrated circuit. Between the supply voltage Vcc and the source of PMOS 14 is connected the source-to-drain current path of PMOS 18, which has its gate connected to input terminal 11.

To input terminal 11 is connected one end of the source-to-drain current path of a second voltage suppression NMOS 12B, which has its gate connected to 3.3V system supply voltage Vcc. To the other end of the current path of NMOS 12B is connected the drain of NMOS 21B which has its source and gate connected to reference supply voltage Vss. The gate of NMOS 22, which has its source connected to input terminal 11 and its drain connected to Vcc, is connected to the other end of the current path of NMOS 12B, i.e., the connection point of NMOS 12B and NMOS 21B.

That is, the circuit is characterized in that NMOS 12B and NMOS 21B are added to the circuit of FIG. 43.

With the circuit of FIG. 46, when a 5V signal is applied to input terminal 11, the voltage at the other end of the current path of NMOS 12A will not go higher than (Vcc–Vtn) where Vtn is the threshold voltage of NMOS 12A because the gate of NMOS 12A is connected to the 3.3V supply voltage Vcc. Thus, a voltage of 5V is not applied between the gate and source and between the gate and drain of NMOS 12A. Such is the case with each of PMOS 14 and NMOS 15. For this reason, these MOS transistors will not suffer gate-oxide breakdown.

When a surge voltage is applied to input terminal 11, on the other hand, it is passed to the reference supply voltage Vss or the supply voltage Vcc through NMOS 12B and NMOS 21B or NMOS 22, thereby protecting the internal circuit from ESD breakdown.

FIGS. 47 and 48 show interface circuits according to thirty-fifth and thirty-sixth embodiments of the invention which are each applied to an input circuit. The input circuit of FIG. 47 is distinct from the circuit of FIG. 46 in that a protection resistor 19 is connected between input terminal 11 and one end of the current path of each of NMOSs 12A and 12B. In the input circuit of FIG. 48, three separate resistors 19A, 19B and 19C are used instead of protection resistor 19 used in the circuit of FIG. 47, resistor 19A being connected between input terminal 11 and NMOS 12A and resistor 19B being connected between input terminal 11 and the gate of PMOS 18, and resistor 19C being connected between the other end of the current path of NMOS 12B and the gate of NMOS 22.

The thirty-seventh and thirty-sixth embodiment circuits of FIGS. 47 and 48 can prevent a surge voltage applied to input terminal 11 from being impressed to voltage suppression NMOS 12A and the internal circuit immediately, thus further increasing the resistance to ESD breakdown.

Figure 49:
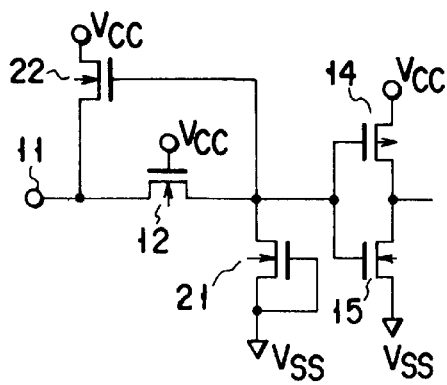
FIG. 49 is a schematic diagram of an interface circuit according to a thirty-seventh embodiment of the present invention which is applied to an input circuit.

FIG. 49 shows an interface circuit according to a thirty-seventh embodiment of the invention which is applied to an input circuit which, as in FIG. 4, is constructed by the use of a process for 3.3V supply system and permits entry of signals for 5V supply system. This circuit is distinct from the circuit of FIG. 43 in that PMOS 18 is omitted. Thus, the advantage is substantially the same as that of the circuit of FIG. 43.

Figure 50:
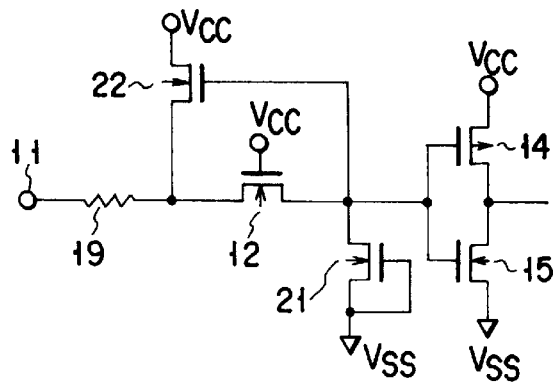
FIG. 50 is a schematic diagram of an interface circuit according to a thirty-eighth embodiment of the present invention which is applied to an input circuit.

FIG. 50 shows an interface circuit according to a thirty-eighth embodiment of the invention which is applied an input circuit. This circuit is distinct from the circuit of FIG. 49 in that a protection resistor 19 is connected between input terminal 11 and the connection point of the current paths of NMOS 12 and NMOS 22. This circuit can prevent a surge voltage applied to input terminal 11 from being impressed to protection circuit immediately for the same reason as in the circuits of FIGS. 14, 15, 17 and 18, thus further increasing the resistance to ESD breakdown.

Figure 51:
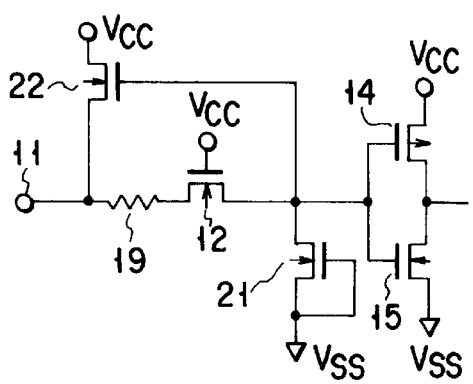
FIG. 51 is a schematic diagram of an interface circuit according to a thirty-ninth embodiment of the present invention which is applied to an input circuit.

FIG. 51 shows an interface circuit according to a thirty-ninth embodiment of the invention which is applied to an input circuit. This circuit is distinct from the circuit of FIG. 49 in that protection resistor 19 is connected between one end of the current path of NMOS 22, connected to input terminal 11, and one end of the current path of NMOS 12.

Figure 52:
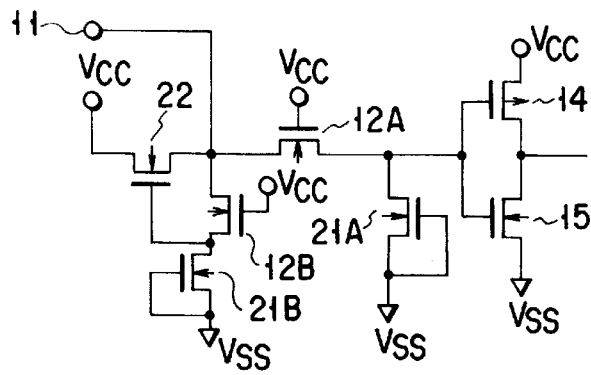
FIG. 52 is a schematic diagram of an interface circuit according to a fortieth embodiment of the present invention which is applied to an input circuit.

FIG. 52 shows an interface circuit according to a fortieth embodiment of the invention which is applied to an input circuit which, as in FIG. 4, is constructed by the use of a process for 3.3V supply system and permits entry of signals for 5V supply system. This circuit is distinct from the circuit of FIG. 46 in that PMOS 18 is omitted. Thus, the advantage is substantially the same as that of the circuit of FIG. 46.

Figure 53:
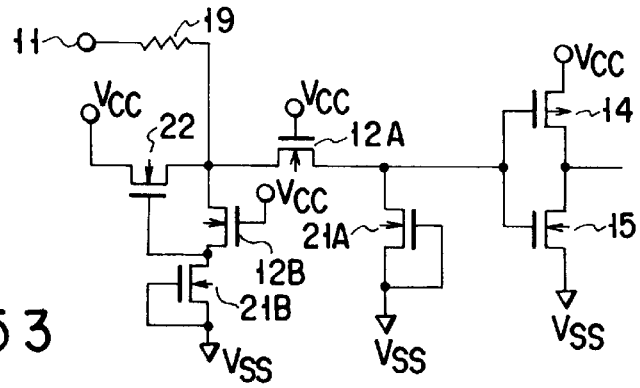
FIG. 53 is a schematic diagram of an interface circuit according to a forty-first embodiment of the present invention which is applied to an input circuit.

FIG. 53 shows an interface circuit according to a forty-first embodiment of the invention which is applied to an input circuit. This circuit is distinct from the circuit of FIG. 52 in that a protection resistor 19 is connected between input terminal 11 and the connection point of the current paths of NMOS 12A and NMOS 12B. This circuit can prevent a surge voltage applied to input terminal 11 from being impressed to protection circuit immediately for the same reason as in the circuits of FIGS. 14, 15, 17 and 18, thus further increasing the resistance to ESD breakdown.

Figure 54:
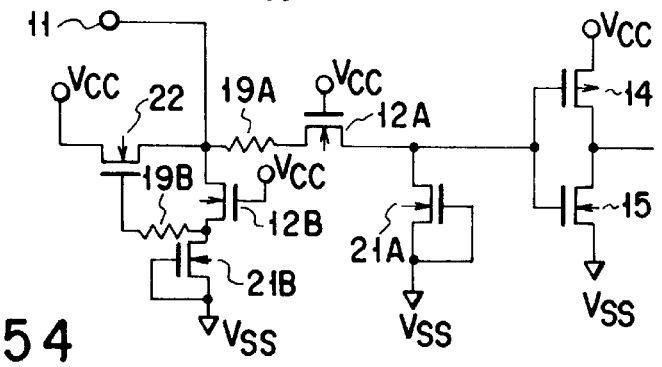
FIG. 54 is a schematic diagram of an interface circuit according to a forty-second embodiment of the present invention which is applied to an input circuit.

FIG. 54 shows an interface circuit according to a forty-second embodiment of the invention which is applied to an input circuit. The input circuit of FIG. 54 is distinct from the circuit of FIG. 53 in that two separate resistors 19A and 19B are used instead of protection resistor 19 used in the circuit of FIG. 53, resistor 19A being connected between input terminal 11 and NMOS 12A and resistor 19B being connected between the other end of the current path of NMOS 12B and the gate of NMOS 22.

FIG. 55 shows an interface circuit according to a fourth-third embodiment of the invention which is applied to an output circuit which, as in FIG. 5, is constructed by the use of a process adapted to 3.3V supply system. This output circuit is basically arranged to, on the one hand, output a high-level signal voltage (Vcc: 3.3V) from an output terminal 33 by controlling the gate of an output PMOS 32 in accordance with an output of a NAND gate 31 when it receives an input signal INPUT at a high level of 3.3V supply system and an output enable signal ENABLE and, on the other hand, output a low-level signal voltage (Vss: 0V) from output terminal 33 by controlling the gate of an output NMOS 35 by an output of an NOR gate 34 when it receives a low-level input signal and the inverse of the output enable signal ENABLE.

To output terminal 33 is connected one end of the source-to-drain current path of a voltage suppression NMOS 36, the other end of which is connected to the drain of NMOS 35 and a protection circuit 37. The gate of NMOS 36 is connected to Vcc. The protection circuit 37 is composed of a PMOS 38 and an NMOS 39. PMOS 38 has its source and gate connected to Vcc and its drain connected to the connection point of NMOSs 35 and 36, while NMOS 39 has its source and gate connected to Vss and its drain connected to the connection point of NMOSs 35 and 36.

In the output circuit thus arranged, output terminal 33 is connected to a bus line not shown. Thus, there is a possibility that a circuit connected to that bus line may output a voltage of 5V. In such a case, this voltage is applied to output terminal 33. At this point, the voltage at one of the source and the drain of NMOS 36 that is connected to protection circuit 37 will not go higher than (Vcc−Vtn) where Vtn is the threshold voltage of NMOS 36 because the gate of NMOS 36 is connected to the 3.3V supply voltage Vcc. Therefore, a voltage of 5V is not applied between the gate and source and between the gate and drain of NMOS 36. Such is the case with NMOS 35. For this reason, no gate-oxide breakdown occurs in all MOS transistors including the MOS transistors in protection circuit 37.

When a surge voltage is applied to output terminal 33, on the other hand, it is passed to supply voltage Vcc or reference supply voltage Vss through NMOS 36 and a parasitic PN diode present between the drain and back gate of PMOS 38 or a parasitic PN diode present between the drain and back gate of NMOS 39 in protection circuit 37, thus protecting the internal circuit from ESD breakdown.

Other MOS transistors than those described above are provided as supplements for other purposes than setting output terminal 33 to a high level or low level. These MOS transistors used as supplements will be described briefly. MOS transistors 40, 41, 42 and 43 are provided for avoiding circuit breakdown when a voltage higher than Vcc, say, 5V, is applied to output terminal 33. That is, assume that this output circuit is in the tri-state. At this point, NAND gate 31 provides a high-level output. When output terminal 33 is biased to more than Vcc, PMOS 43 turns off, so that the common back gates of MOS transistors 32, 41, 42 and 43 are disconnected from Vcc. These back gates are raised to a voltage that is lower than 5V at output terminal 33 by a VF (forward voltage drop across a PN junction) through a PN junction between the drain and back gate of each of PMOSs 32 and 42 and then stabilize. Thus, leakage to the common back gates that would occur normally is avoided. On the other hand, a voltage of 5V at output terminal 33 is transmitted to the gate of PMOS 32 via PMOS 42. For this reason, PMOS 32 will not turn ON even if output terminal 33 is biased to a higher voltage than Vcc, avoiding leakage to Vcc. At this point, PMOS 41 is connected to output terminal 33 the voltage at which is 5V and it is therefore completely OFF. The gate of NMOS 40 is connected to Vcc. Thus, a voltage of Vcc or more transmitted to the gate of PMOS 32 will not appear at the output terminal of NAND gate 31. MOS transistors 40, 41, 42 and 43 function as described above when a voltage of Vcc or more is applied to output terminal 33.

Next, the operation when the voltage level at output terminal 33 is changed to the low level will be described. PMOS 43 turns ON because its gate voltage falls. As a result, the common back gates of MOS transistors 32, 41, 42 and 43 are biased to the Vcc level. PMOS 41 has a function of transferring a high-level output of NAND gate 31 to the gate of PMOS 32 without any voltage drop when output terminal 33 is at a voltage sufficiently lower than Vcc.

Figure 59:
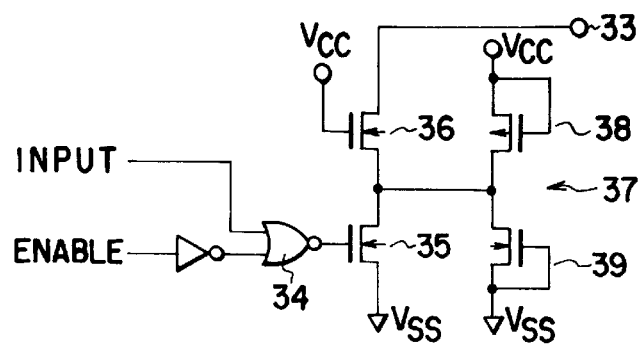
FIG. 59 shows an essential part of the output circuit of FIG. 55.

MOS transistors 44 to 54 are provided for reducing power supply noise at the time of switching. Assume now that output terminal 33 is at the low level, that is, input signal INPUT is at the low level. In this case, PMOSs 47, 48 and NMOS 54 are ON and the connection point of NMOSs 35 and 36 is at the low level. NMOS 50 is OFF since the input signal is low, and the drain of PMOS 45 is at the high level, so that PMOS 44 is OFF. In this state, when the input signal is changed to the high level, PMOS 47 turns OFF and NMOS 50 turns ON. As a result, a current path is established from Vcc to the connection point of NMOSs 35 and 36 through MOS transistors 45, 46, 50 and 51. At this point, the voltage at the drain of PMOS 45 (the gate of PMOS 44) falls from the initial voltage Vcc, turning PMOS 44 ON. Since NMOS 49 is ON from the beginning, a current flows from Vcc to the output terminal of NAND gate 31 through PMOS 44 and NMOS 49. Since the input signal has gone high, NAND gate 31 will inherently produce a low-level output. However, the output of NAND gate 31 goes low slowly because of MOS transistors 44 and 49 connected with Vcc. As a result, PMOS 32 in the final stage turns ON slowly, suppressing the generation of power supply noise. After that, the voltage at the connection point of NMOSs 35 and 36 rises gradually as the voltage at output terminal 33 rises slowly. As a result, the voltage at the drain of PMOS 45 also rises gradually with the result that PMOS 44 is turned OFF. With PMOS 44 turned OFF, the output signal of NAND gate 31 goes fully high and stabilizes. Also, at the switching time when the input signal is changed to the low level with the output terminal 33 at the high level, the generation of power supply noise is likewise suppressed. That essential part of the output circuit of FIG. 55 which is adapted to set output terminal 33 to the low level is shown in FIG. 59.

Figure 60:
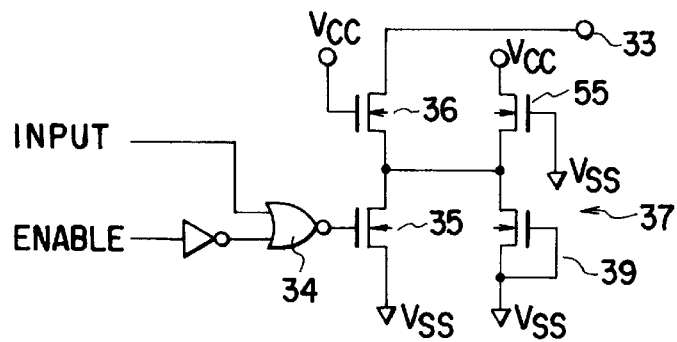
FIG. 60 shows an essential part of the output circuit of FIG. 56.

FIG. 56 shows an interface circuit according to a forty-fourth embodiment of the invention which is applied to an output circuit which, as in FIG. 5, is constructed by the use of a manufacturing process adapted to 3.3V supply system. This circuit is distinct from the circuit of FIG. 55 in that an NMOS 55 having its gate connected to Vss is used in place of PMOS 38 in protection circuit 37. In this circuit, when a surge voltage of positive polarity is applied to output terminal 33, it is passed to Vss by the transistor action of a parasitic bipolar transistor associated with NMOS 55 in protection circuit 37. For a surge voltage of negative polarity, the circuit operates in the same manner as the circuit of FIG. 55. That essential part of the output circuit of FIG. 56 which is adapted to set output terminal 33 to the low level is shown in FIG. 60.

Figure 57:
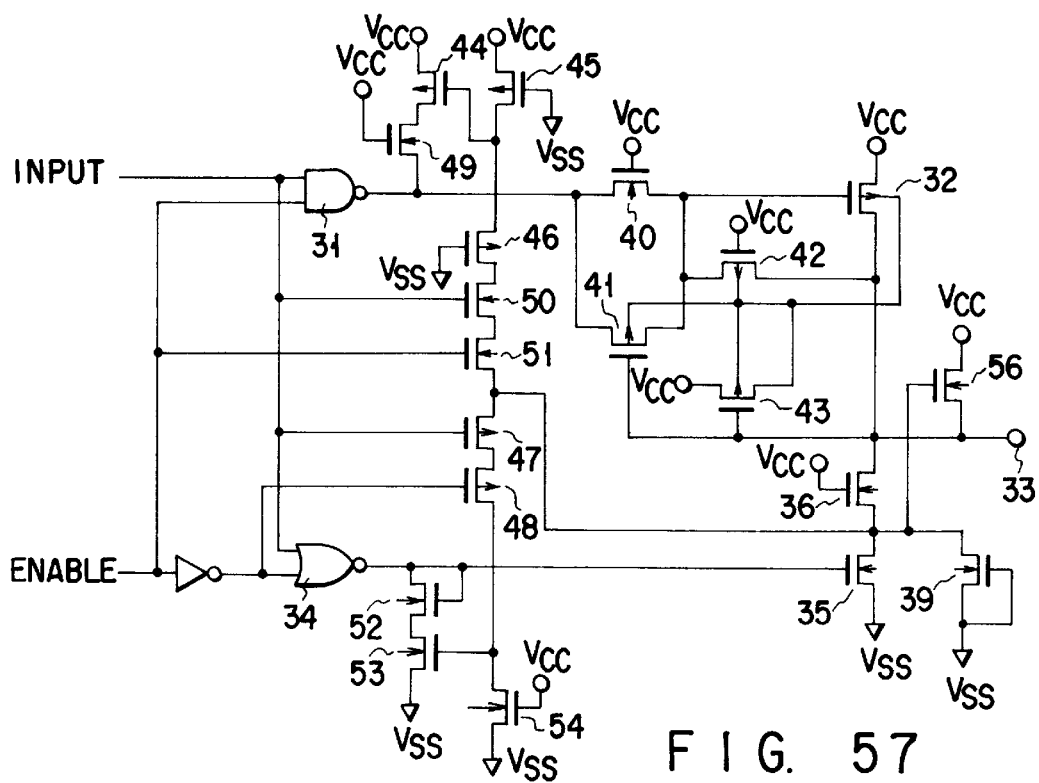
FIG. 57 is a schematic diagram of an interface circuit according to a forty-fifth embodiment of the present invention which is applied to an input circuit.
Figure 61:
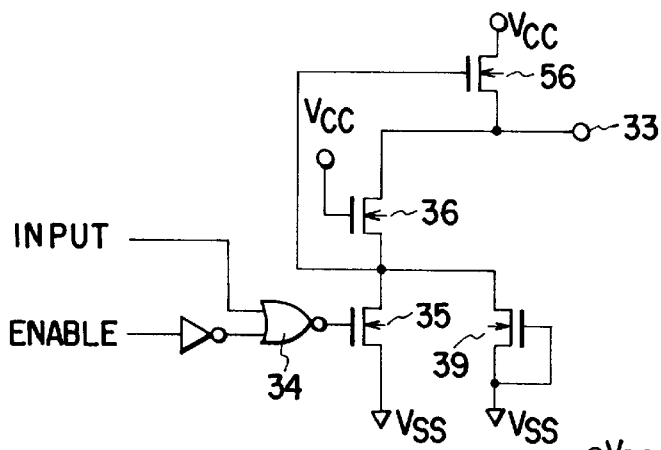
FIG. 61 shows an essential part of the output circuit of FIG. 57.

FIG. 57 shows an interface circuit according to a forty-fifth embodiment of the invention which is applied to an output circuit which, as in FIG. 5, is constructed by the use of a manufacturing process adapted to 3.3V supply system. This circuit is distinct from the circuit of FIG. 55 in that NMOS 38 in protection circuit 37 is replaced with an NMOS 56 having its source-to-drain current path connected between Vcc and output terminal 33 and its gate connected to the connection point of NMOSs 35 and 36. NMOS 56 corresponds to NMOS 22 described in conjunction with the circuit of FIG. 43. When a surge voltage of positive polarity is applied to output terminal 33, it is directly passed to Vcc through NMOS 56 without passing through NMOS 36. That essential part of the output circuit of FIG. 57 which is adapted to set output terminal 33 to the low level is shown in FIG. 61.

Figure 58:
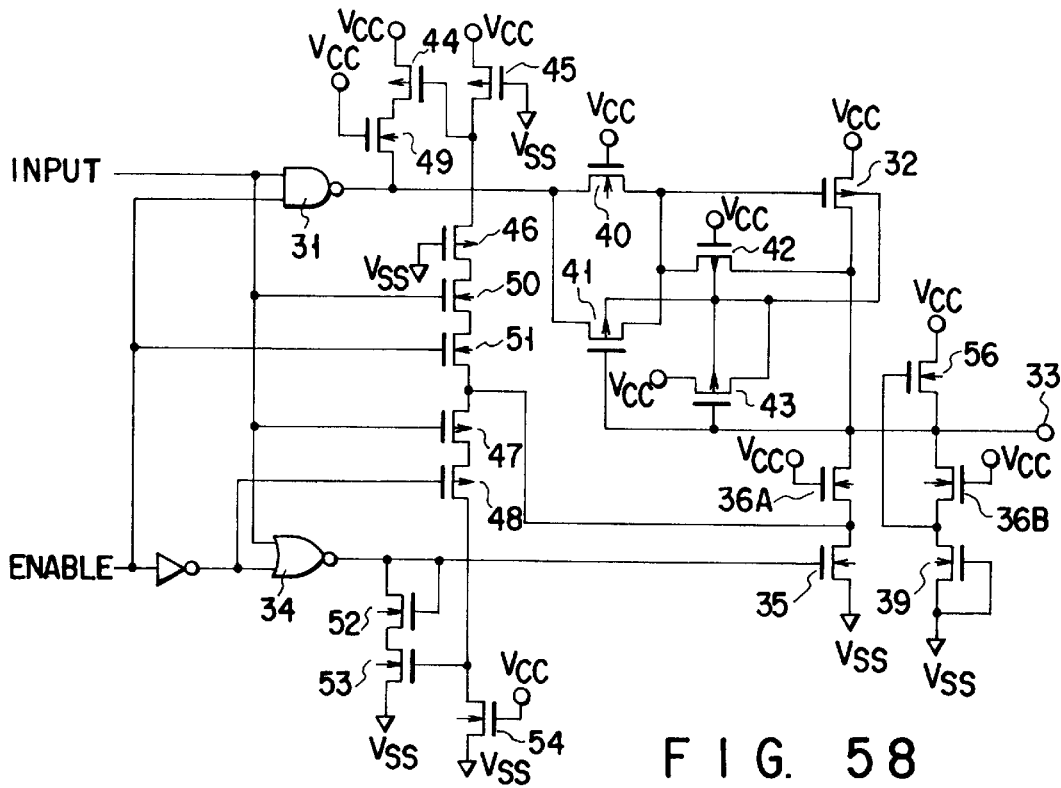
FIG. 58 is a schematic diagram of an interface circuit according to a forty-sixth embodiment of the present invention which is applied to an input circuit.

FIG. 58 shows an interface circuit according to a forty-sixth embodiment of the invention which is applied to an output circuit which is constructed by the use of a manufacturing process adapted to 3.3V supply system. In this circuit, to output terminal 33 is connected to one end of the source-to-drain current path of a first voltage suppression NMOS 36A, which has its gate connected to 3.3V supply system supply voltage Vcc. To the other end of the current path of NMOS 36A is connected the drain of NMOS 35 serving as an output transistor.

To output terminal 33 is connected one end of the source-to-drain current path of a second voltage relaxation NMOS 36B, which has its gate connected to 3.3V system supply voltage Vcc. The other end of the current path of NMOS 36B is connected to the drain of NMOS 39. The source-to-drain current path of NMOS 56, which has its gate connected to the connection point of NMOSs 39 and 36B, is connected between Vcc and output terminal 33.

That is, the circuit of FIG. 58 is characterized in that the second voltage suppression NMOS 36B is added to the circuit of FIG. 57, and that the connection point of NMOSs 36A and 35 is electrically isolated from the connection point of the gate of NMOS 57 and the source of NMOS 39.

Figure 62:
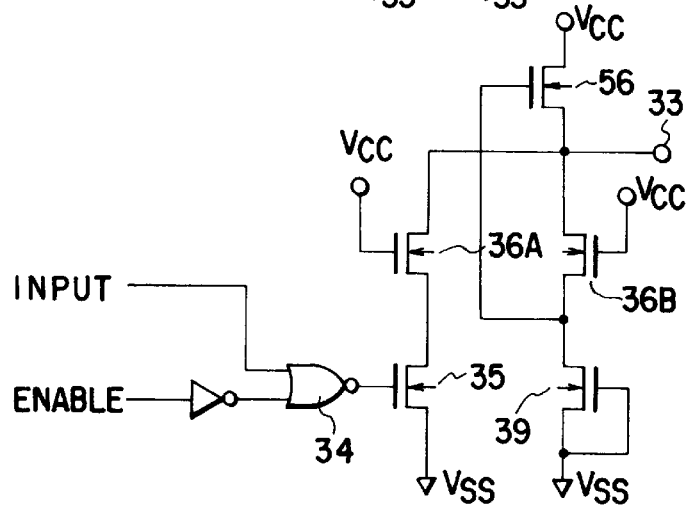
FIG. 62 shows an essential part of the output circuit of FIG. 58.

In the circuit of FIG. 58, when a surge voltage is applied to output terminal 33, it is passed to reference supply voltage Vss or supply voltage Vcc through NMOS 36B and NMOS 39 or NMOS 56, thereby protecting the internal circuit against ESD breakdown. That essential part of the circuit of FIG. 58 which is adapted to set output terminal 33 to the low level is shown in FIG. 62.

FIG. 63 shows an interface circuit according to a fourth-seventh embodiment of the invention which is applied to an output circuit, which is distinct from the circuits shown in FIGS. 57 and 61 in that the gate of NMOS 56 is connected to the connection point of NMOSs 35 and 36 by protection resistor 19 instead of being directly connected.

FIG. 64 shows an interface circuit according to a fourth-eighth embodiment of the invention which is applied to an output circuit, which is distinct from the circuits shown in FIGS. 57 and 61. This circuit is characterized in that first and second voltage suppression NMOSs 36A and 36B are provided, an NMOS 39A for protection against ESD is connected to the connection point of NMOSs 35 and 36A, and an NMOS 39 for protection against ESD and NMOS 56 are connected to NMOS 36B.

In this embodiment, when a surge voltage is applied to output terminal 33, it is passed to Vss or Vcc through second voltage suppression NMOS 36B and NMOS 39B or NMOS 56. Thus, it will be understood that NMOS 39A connected to first voltage suppression NMOS 36A is used as a supplement.

FIG. 65 shows an interface circuit according to a fourth-ninth embodiment of the invention which is applied to an input/output circuit which is constructed by the use of a process adapted to 3.3V supply. This circuit is provided with an input/output terminal 61. In order for the input/output circuit to output a signal at a high or low level from input/output terminal 61 when it is used an output terminal, the output stage is provided with PMOS 32 and NMOS 35 as shown in FIGS. 55 and 58. In FIG. 65, however, there is shown only that essential part of the circuit which is adapted to set input/output terminal 61 to a low level. That is, to input/output terminal 61 is connected one end of the source-to-drain current path of voltage suppression NMOS 36, the other end of which is connected to the drain of NMOS 35 in the output stage through protection circuit 62. The gate of NMOS 36 is connected to Vcc. To the other end of the current path of NMOS 36 is connected the common gates of a PMOS 63 and an NMOS 64 in the input stage through protection circuit 62. The drains of PMOS 63 and NMOS 64 are connected together. A signal at the common drains of PMOS 63 and NMOS 64 is fed into the integrated circuit. The source of NMOS 64 is connected to Vss. Between the source of PMOS 63 and Vcc is connected the source-to-drain current path of a through-current preventing PMOS 65, which has its gate connected to input/output terminal 61.

The protection circuit 62 is composed of a PMOS 66 and an NMOS 67, PMOS 66 having its source and gate connected to Vcc and its drain connected to the connection point of NMOSs 35 and 36 and NMOS 67 having its source and gate connected to Vss and its drain connected to the connection point of NMOSs 35 and 36.

In the circuit thus arranged, when a voltage of 5V is applied to input/output terminal 61, a voltage which is lower than 3V (Vcc) by Vtn (=threshold voltage of NMOS 36) appears at the connection point of NMOSs 35 and 36 as described previously, thus protecting the MOS transistors in the output and input stages from gate-oxide breakdown.

When a surge voltage is applied to input/output terminal 61, it is passed to Vcc or Vss through NMOS 36 and PMOS 66 or NMOS 67 in protection circuit 62, thus preventing ESD breakdown.

Figure 66:
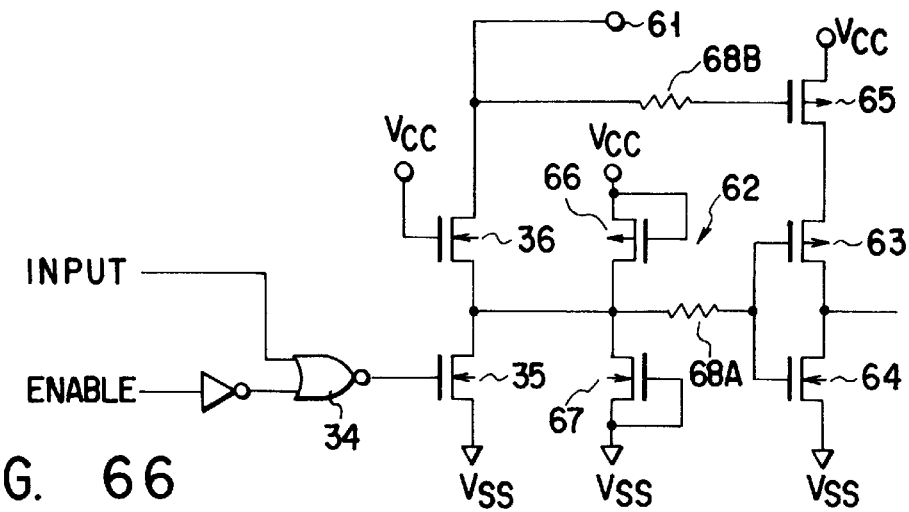
FIG. 66 is a schematic diagram of an interface circuit according to a fiftieth embodiment of the present invention which is applied to an input/output circuit.

FIG. 66 shows an interface circuit according to a fiftieth embodiment of the invention which is applied to an input/output circuit which is constructed by the use of a process adapted to 3.3V supply. This circuit is distinct from the circuit of FIG. 65 in that a resistor 68A, having the same function as resistor 19A in FIG. 15, is connected between the other end of the current path of NMOS 36 and the common gates of PMOS 63 and NMOS 64 in the input stage and a resistor 68B, having the same function as resistor 19B in FIG. 15, is connected between input/output terminal 61 and the gate of PMOS 65 in the input stage.

Figure 67:
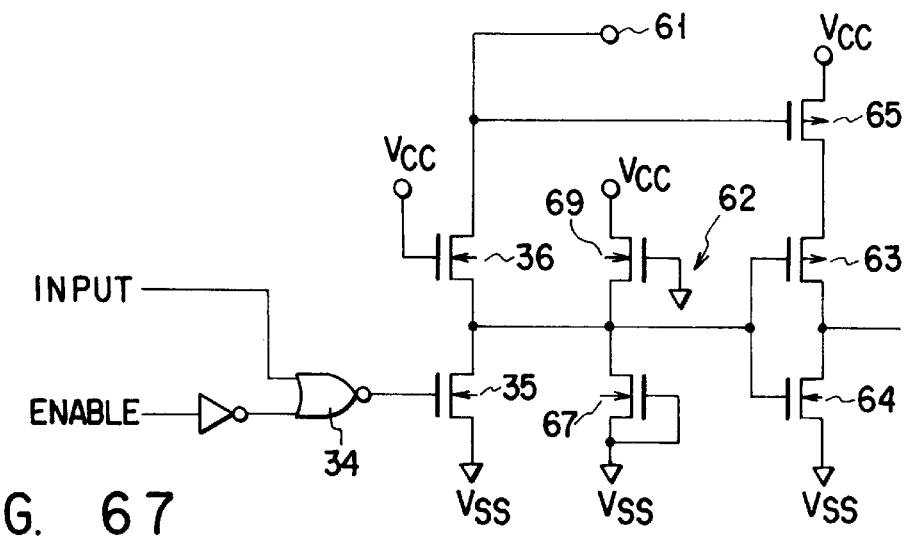
FIG. 67 is a schematic diagram of an interface circuit according to a fifty-first embodiment of the present invention which is applied to an input/output: circuit.

FIG. 67 shows an interface circuit according to a fifty-first embodiment of the invention which is applied to an input/output circuit which is constructed by the use of a process adapted to 3.3V supply. This circuit is distinct from the circuit of FIG. 65 in that PMOS 66 in protection circuit 62 is replaced with an NMOS 69, which has its drain connected to Vcc, its gate connected to Vss and its source connected to the connection point of NMOSs 35 and 36.

In the circuit of FIG. 67, unlike the circuit of FIG. 65, when a surge voltage of positive polarity is applied to input/output terminal 61, it is passed to Vcc by the transistor action of a parasitic NPN bipolar transistor consisting of the source, back gate and drain of NMOS 69 in protection circuit 62.

Figure 68:
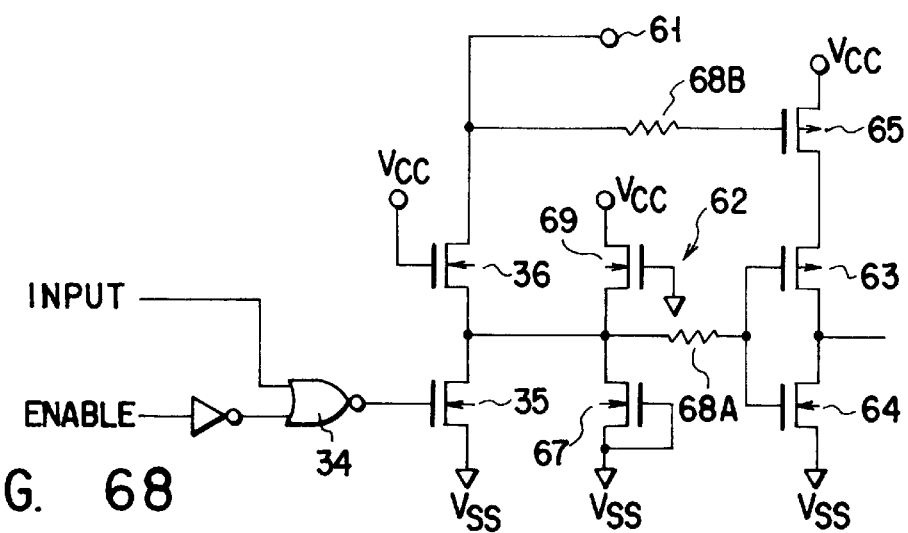
FIG. 68 is a schematic diagram of an interface circuit according to a fifty-second embodiment of the present invention which is applied to an input/output circuit.

FIG. 68 shows an interface circuit according to a fifty-second embodiment of the invention which is applied to an input/output circuit which is constructed by the use of a process adapted to 3.3V supply. This circuit is characterized in that resistors 68A and 68B as used in the circuit of FIG. 66 are added to the circuit of FIG. 67.

FIG. 69 shows an interface circuit according to a fifty-third embodiment of the invention which is applied to an input/output circuit which is constructed by the use of a process adapted to 3.3V supply. This circuit is characterized in that PMOS 69 in protection circuit 62 in the circuit of FIG. 67 is replaced with an NMOS 70 which is equivalent in function to NMOS 56 in the circuits of FIGS. 57 and 61.

FIG. 70 shows an interface circuit according to a fifty-fourth embodiment of the invention which is applied to an input/output circuit which is constructed by the use of a process adapted to 3.3V supply. This circuit is characterized in that resistors 68A and 68B as used in the circuit of FIG. 66 are added to the circuit of FIG. 69.

In each of the embodiments described previously, in order to obtain the effects of the present invention more certainly, it is preferable that voltage suppression NMOSs 12, 36 and NMOSs 17, 21, 39, 67 which, in the protection circuit, are connected to the Vss side be placed close to one another in an integrated circuit. Such is the case with voltage suppression NMOSs 12, 26 and PMOSs 16, 38, 66 and NMOSs 20, 55, 69 each of which is connected to the Vcc side in the protection circuit. This is because, when a voltage suppression NMOS acts as a bipolar transistor to thereby transmit a surge voltage to the protection circuit side, it becomes easy for an NMOS in the protection circuit as well to act as a bipolar transistor to thereby pass the surge voltage to the Vcc side or Vss side.

In each of the embodiments described previously, for each MOS having its gate connected to Vcc like NMOS 36 in the circuit of FIG. 70, it is desirable to connect a gate protection resistor R between gate and Vcc as shown in FIG. 71 in order to obtain the effects of the present invention more certainly. That is, the effect of a CR lowpass filter consisting of resistor R and gate capacitance can be expected when a surge voltage mixed in the power supply voltage is applied to the gate.

As described above, according to the present invention there is provided semiconductor integrated interface circuits which can protect an internal circuit from a surge voltage applied to an external terminal and prevent the breakdown of a protection circuit even when a signal voltage higher than a supply voltage used in the internal circuit is applied to the external terminal.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An interface circuit for use in a semiconductor integrated circuit comprising:
    an external terminal;
    a first N-channel MOS transistor for suppressing a voltage having a source-to-drain current path connected at a first end thereof to said external terminal and a gate connected to an internal supply voltage; and
    a protection circuit against surge voltage connected to a second end of said current path of said first N-channel MOS transistor, wherein said protection circuit comprises:
        a second N-channel MOS transistor having a first end connected to said internal supply voltage, a gate connected to a reference supply voltage and a second end connected to the second end of said current path of said first N-channel MOS transistor; and
        a third N-channel MOS transistor having a first end and a gate connected to said reference supply voltage and a second end connected to the second end of said current path of said first N-channel MOS transistor.

2. The interface circuit according to claim 1, wherein said external terminal is a signal input terminal.

3. The interface circuit according to claim 1, wherein said external terminal is a signal output terminal.

4. The interface circuit according to claim 1, wherein said external terminal is a signal input/output terminal.

5. An interface circuit for use in a semiconductor integrated circuit comprising:
    an external terminal;
    a first N-channel MOS transistor for suppressing a voltage having a source-to-drain current path connected at a first end thereof to said external terminal and a gate connected to an internal power supply voltage;
    a second N-channel MOS transistor for surge protection having a source-to-drain current path connected between a second end of said current path of said first N-channel MOS transistor and a reference supply voltage; and
    a third N-channel MOS transistor for surge protection having a source-to-drain current path connected between said internal power supply voltage and said external terminal and a gate connected to the second end of said current path of said first N-channel MOS transistor.

6. An interface circuit for use in a semiconductor integrated circuit comprising:
    an external terminal;
    a first N-channel MOS transistor for suppressing a voltage having a source-to-drain current path connected at a first end thereof to said external terminal and a gate connected to an internal supply voltage; and
    a protection circuit against surge voltage connected between a second end of said current path of said first N-channel MOS transistor and an internal circuit, wherein said protection circuit comprises:
        a second N-channel MOS transistor having a first end connected to said internal supply voltage, a gate connected to a reference supply voltage and a second end connected to the second end of said current path of said first N-channel MOS transistor; and
        a third N-channel MOS transistor having a first end and a gate connected to said reference supply voltage and a second end connected to the second end of said current path of said first N-channel MOS transistor.

7. The interface circuit according to claim 6, wherein said external terminal is a signal input terminal.

8. The interface circuit according to claim 6, wherein said external terminal is a signal output terminal.

9. The interface circuit according to claim 6, wherein said external terminal is a signal input/output terminal.

10. An interface circuit for use in a semiconductor integrated circuit:
    an external terminal;
    a first N-channel MOS transistor for suppressing a voltage having a source-to-drain current path connected at a first end thereof to said external terminal and connected at a second end thereof to an internal circuit and a gate connected to an internal supply voltage;
    a second N-channel MOS transistor for suppressing a voltage having a source-to-drain current path connected at a first end thereof to said external terminal and a gate connected to said internal supply voltage;
    a surge protection circuit connected to a second end of said current path of said second N-channel MOS transistor, wherein said surge protection circuit comprises:
        a P-channel MOS transistor having a first end and a gate connected to said internal supply voltage and a second end connected to the second end of said current path of said second N-channel MOS transistor; and
        a third N-channel MOS transistor having a first end and a gate connected to a reference supply voltage and a second end connected to the second end of said current path of said second N-channel MOS transistor.

11. An interface circuit for use in a semiconductor integrated circuit:
an external terminal;
a first N-channel MOS transistor for suppressing a voltage having a source-to-drain current path connected at a first end thereof to said external terminal and connected at a second end thereof to an internal circuit and a gate connected to an internal supply voltage;
a second N-channel MOS transistor for suppressing a voltage having a source-to-drain current path connected at a first end thereof to said external terminal and a gate connected to said internal supply voltage;
a surge protection circuit connected to a second end of said current path of said second N-channel MOS transistor, wherein said surge protection circuit comprises:
 a third N-channel MOS transistor having a first end connected to said internal supply voltage, a gate connected to a reference supply voltage and a second end connected to the second end of said current path of said second N-channel MOS transistor; and
 a fourth N-channel MOS transistor having a first end and a gate connected to said reference supply voltage and a second end connected to the second end of said current path of said second N-channel MOS transistor.

12. The interface circuit according to claim 10 or 11, wherein said external terminal is a signal input terminal.

13. The interface circuit according to claim 10 or 11, wherein said external terminal is a signal output terminal.

14. An interface circuit for use in a semiconductor integrated circuit comprising:
an external terminal;
a first N-channel MOS transistor for suppressing a voltage having a source-to-drain current path connected at a first end thereof to said external terminal and a gate connected to an internal supply voltage;
a first surge protection circuit connected between a second end of said current path of said first N-channel MOS transistor and an internal circuit;
a second N-channel MOS transistor for suppressing a voltage having a source-to-drain current path connected at a first end thereof to said external terminal and a gate connected to said internal supply voltage; and
a second surge protection circuit connected to a second end of said current path of said second N-channel MOS transistor, wherein
said first surge protection circuit comprises:
 a first P-channel MOS transistor having a first end and a gate connected to said internal supply voltage and a second end connected to the second end of said current path of said first N-channel MOS transistor; and
 a third N-channel MOS transistor having a first end and a gate connected to a reference supply voltage and a second end connected to the second end of said current path of said first N-channel MOS transistor, and
said second surge protection circuit comprises:
 a second P-channel MOS transistor having a first end and a gate connected to said internal supply voltage and a second end connected to the second end of said current path of said second N-channel MOS transistor; and
 a fourth N-channel MOS transistor having a first end and a gate connected to said reference supply voltage and a second end connected to the second end of said current path of said second N-channel MOS transistor.

15. An interface circuit for use in a semiconductor integrated circuit comprising:
an external terminal;
a first N-channel MOS transistor for suppressing a voltage having a source-to-drain current path connected at a first end thereof to said external terminal and a gate connected to an internal supply voltage;
a first surge protection circuit connected between a second end of said current path of said first N-channel MOS transistor and an internal circuit;
a second N-channel MOS transistor for suppressing a voltage having a source-to-drain current path connected at a first end thereof to said external terminal and a gate connected to said internal supply voltage; and
a second surge protection circuit connected to a second end of said current path of said second N-channel MOS transistor, wherein
said first surge protection circuit comprises:
 a third N-channel MOS transistor having a first end connected to said internal supply voltage, a gate connected to a reference supply voltage and a second end connected to the second end of said current path of said first N-channel MOS transistor; and
 a fourth N-channel MOS transistor having a first end and a gate connected to said reference supply voltage and a second end connected to the second end of said current path of said first N-channel MOS transistor, and
said second surge protection circuit comprises:
 a P-channel MOS transistor having a first end and a gate connected to said internal supply voltage and a second end connected to the second end of said current path of said second N-channel MOS transistor; and
 a fifth N-channel MOS transistor having a first end and a gate connected to said reference supply voltage and a second end connected to the second end of said current path of said second N-channel MOS transistor.

16. The interface circuit according to claim 14 or 15, wherein said external terminal is a signal input terminal.

17. The interface circuit according to claim 14 or 15, wherein said external terminal is a signal output terminal.

18. An interface circuit for use in a semiconductor integrated circuit comprising:
an input/output terminal;
a first N-channel MOS transistor for suppressing a voltage having a source-to-drain current path connected at a first end thereof to said input/output terminal and a gate connected to an internal supply voltage;
a second N-channel MOS transistor having a gate controlled by an internal signal and a source-to-drain current path connected between a ground potential and a second end of the source-to-drain current path of said first N-channel MOS transistor; and
a protection circuit against surge voltage connected to the second end of said current path of said first N-channel MOS transistor, wherein said protection circuit comprises:
 a P-channel MOS transistor having a first end and a gate connected to said internal supply voltage and a second end connected to the second end of said current path of said first N-channel MOS transistor; and a third N-channel MOS transistor having a first end and a gate connected to a reference supply voltage and a second end connected to the second end of said current path of said first N-channel MOS transistor.

19. An interface circuit for use in a semiconductor integrated circuit:

an input/output terminal;

a first N-channel MOS transistor for suppressing a voltage having a source-to-drain current path connected at a first end thereof to said input/output terminal and a gate connected to an internal supply voltage;

a second N-channel MOS transistor having a gate controlled by an internal signal and a source-to-drain current path connected between a ground potential and a second end of the source-to-drain current path of said first N-channel MOS transistor; and a protection circuit against surge voltage connected to the second end of said current path of said first N-channel MOS transistor, wherein said protection circuit comprises:

a third N-channel MOS transistor having a first end connected to said internal supply voltage, a gate connected to a reference supply voltage and a second end connected to the second end of said current path of said first N-channel MOS transistor; and a fourth N-channel MOS transistor having a first end and a gate connected to said reference supply voltage and a second end connected to the second end of said current path of said first N-channel MOS transistor.

20. An interface circuit for use in a semiconductor integrated circuit comprising:

an input/output terminal;

a first N-channel MOS transistor for suppressing a voltage, said first N-channel MOS transistor having a source-to-drain current path connected at a first end to said input/output terminal and a gate connected to an internal supply voltage;

a second N-channel MOS transistor having a gate controlled by an internal signal and a source-to-drain current path connected between a ground potential and a second end of the current path of said first N-channel MOS transistor; and a protection circuit against surge voltage connected between the second end of said current path of said first N-channel MOS transistor and an internal circuit, wherein said protection circuit comprises:

a P-channel MOS transistor having a first end and a gate connected to said internal supply voltage and a second end connected to the second end of said current path of said first N-channel MOS transistor; and a third N-channel MOS transistor having a first end and a gate connected to a reference supply voltage and a second end connected to the second end of said current path of said first N-channel MOS transistor.

21. An interface circuit for use in a semiconductor integrated circuit comprising:

an input/output terminal;

a first N-channel MOS transistor for suppressing a voltage, said first N-channel MOS transistor having a source-to-drain current path connected at a first end to said input/output terminal and a gate connected to an internal supply voltage;

a second N-channel MOS transistor having a gate controlled by an internal signal and a source-to-drain current path connected between a ground potential and a second end of the current path of said first N-channel MOS transistor; and a protection circuit against surge voltage connected between the second end of said current path of said first N-channel MOS transistor and an internal circuit, wherein said protection circuit comprises:

a third N-channel MOS transistor having a first end connected to said internal supply voltage, a gate connected to a reference supply voltage and a second end connected to the second end of said current path of said first N-channel MOS transistor; and a fourth N-channel MOS transistor having a first end and a gate connected to said reference supply voltage and a second end connected to the second end of said current path of said first N-channel MOS transistor.

* * * * *